US012712186B2

(12) United States Patent
Shike et al.

(10) Patent No.: US 12,712,186 B2
(45) Date of Patent: Aug. 18, 2026

(54) VINYLIDENE FLUORIDE COPOLYMER COMPOSITION AND METHOD FOR PRODUCING SAME, POLYMER DISPERSION SOLUTION, ELECTRODE FOR NONAQUEOUS ELECTROLYTE SECONDARY BATTERY, ELECTROLYTE LAYER FOR NONAQUEOUS ELECTROLYTE SECONDARY BATTERY, AND NONAQUEOUS ELECTROLYTE SECONDARY BATTERY

(71) Applicant: KUREHA CORPORATION, Tokyo (JP)

(72) Inventors: Aya Shike, Tokyo (JP); Yoshiyuki Nagasawa, Tokyo (JP); Tamito Igarashi, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 595 days.

(21) Appl. No.: 18/254,795

(22) PCT Filed: Nov. 25, 2021

(86) PCT No.: PCT/JP2021/043133

§ 371 (c)(1),
(2) Date: May 26, 2023

(87) PCT Pub. No.: WO2022/114044

PCT Pub. Date: Jun. 2, 2022

(65) Prior Publication Data

US 2024/0301105 A1 Sep. 12, 2024

(30) Foreign Application Priority Data

Nov. 30, 2020 (JP) ................................ 2020-198148

(51) Int. Cl.

*C08F 214/22* (2006.01)
*C08F 214/28* (2006.01)
*H01M 4/62* (2006.01)
*H01M 10/0565* (2010.01)
*H01M 10/056* (2010.01)

(52) U.S. Cl.

CPC ........... *H01M 4/623* (2013.01); *C08F 214/22* (2013.01); *C08F 214/28* (2013.01); *H01M 10/0565* (2013.01); *C08F 2800/20* (2013.01); *H01M 10/056* (2013.01)

(58) Field of Classification Search

CPC ............ H01M 4/623; H01M 10/0565; H01M 10/056; H01M 4/139; H01M 10/052; H01M 10/0562; H01M 4/13; H01M 4/137; C08F 214/22; C08F 214/28; C08F 2800/20; C08F 2/26; C08F 6/14; C09D 127/16; Y02E 60/10; C08L 27/16

See application file for complete search history.

(56) References Cited

U.S. PATENT DOCUMENTS

| | | | |
|---|---|---|---|
| 9,799,921 B2 | 10/2017 | Hashimoto et al. | |
| 10,062,923 B2 | 8/2018 | Mimura et al. | |
| 10,511,052 B2 | 12/2019 | Adachi et al. | |
| 10,938,034 B2 | 3/2021 | Nagasawa et al. | |
| 2015/0132638 A1 | 5/2015 | Adachi et al. | |
| 2015/0337157 A1 | 11/2015 | Iida et al. | |
| 2016/0028107 A1 | 1/2016 | Kubo et al. | |
| 2016/0028108 A1 | 1/2016 | Hashimoto et al. | |
| 2016/0365604 A1 | 12/2016 | Mimura et al. | |
| 2018/0358626 A1 | 12/2018 | Nagasawa et al. | |
| 2019/0348711 A1 | 11/2019 | Watanabe | |
| 2020/0020909 A1* | 1/2020 | Sakakibara | C08F 214/225 |

FOREIGN PATENT DOCUMENTS

| | | | |
|---|---|---|---|
| CN | 104903357 A | 9/2015 | |
| CN | 105794019 A | 7/2016 | |
| CN | 108370067 A | 8/2018 | |
| EP | 3070764 A1 * | 9/2016 | H01M 50/417 |
| JP | 2008-103284 A | 5/2008 | |
| JP | .2012-219125 A | 11/2012 | |
| JP | 2015-159067 A | 9/2015 | |

(Continued)

OTHER PUBLICATIONS

Extended European Search Report for European Application No. 24163855.0, dated Jun. 27, 2024.

(Continued)

*Primary Examiner* — Kumar R Bhushan
(74) *Attorney, Agent, or Firm* — Birch, Stewart, Kolasch & Birch, LLP

(57) ABSTRACT

A vinylidene fluoride copolymer composition having stable dispersibility in a dispersion medium over a long period of time, the composition having a melting temperature of 140° C. or lower, a reversing heat flow of the composition has endothermic peaks having an amount of enthalpy of fusion of 2 J/g or more, and an absolute value of a difference between a temperature showing a largest endothermic peak among the endothermic peaks and the melting temperature of the composition is 10° C. or lower. When a dispersion containing butyl butyrate and the vinylidene fluoride copolymer composition (vinylidene fluoride content rate of 10 mass %) is left to stand for 20 hours, a content rate of the vinylidene fluoride copolymer composition in an upper 20 vol % of the dispersion after the dispersion is left to stand is 4.0 mass % or more and 10 mass % or less.

9 Claims, 1 Drawing Sheet

(56) References Cited

FOREIGN PATENT DOCUMENTS

| | | | | |
|---|---|---|---|---|
| JP | 2016-025025 A | | 2/2016 | |
| JP | 2016-025027 A | | 2/2016 | |
| JP | 2016-33913 A | | 3/2016 | |
| JP | 2017-165881 A | | 9/2017 | |
| JP | 6257698 B2 | | 1/2018 | |
| KR | 10-2016-0071440 A | | 6/2016 | |
| KR | 10-2019-0112095 A | | 10/2019 | |
| WO | WO 2012/063827 A1 | | 5/2012 | |
| WO | 2017/126201 A1 | | 7/2017 | |
| WO | 2017/154449 A1 | | 9/2017 | |
| WO | WO-2018173373 A1 | * | 9/2018 | .......... C08F 214/225 |

OTHER PUBLICATIONS

Chinese Office Action and Search Report for Chinese Application No. 202180079773.1, dated Dec. 12, 2024, with an English translation.

Korean Office Action for Korean Application No. 10-2023-7017947, dated Apr. 10, 2025, with English translation.

Korean Office Action for Korean Application No. 10-2024-7008452, dated Oct. 16, 2025, with English translation.

International Preliminary Report on Patentability and Written Opinion of the International Searching Authority for International Application No. PCT/JP2021/043133, dated May 30, 2023.

Extended European Search Report for European Application No. 21898016.7, dated Apr. 29, 2024.

Japanese Office Action for Japanese Application No. 2022-565398, dated Jun. 11, 2024, with an English translation.

Japanese Office Action for Japanese Application No. 2024-031356, dated Dec. 23, 2025, with English translation.

Japanese Office Action for Japanese Application No. 2024-031356, dated Apr. 28, 2026, with English translation.

Indian Examination Report and Search Report for Indian Application No. 202317037092, dated Jun. 9, 2026, with English translation.

* cited by examiner

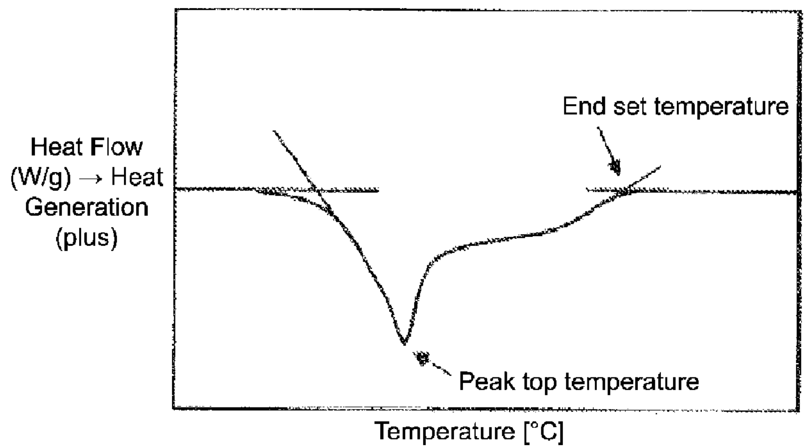
Heat Flow
(W/g) → Heat
Generation
(plus)
End set temperature
Peak top temperature
Temperature [°C]

VINYLIDENE FLUORIDE COPOLYMER COMPOSITION AND METHOD FOR PRODUCING SAME, POLYMER DISPERSION SOLUTION, ELECTRODE FOR NONAQUEOUS ELECTROLYTE SECONDARY BATTERY, ELECTROLYTE LAYER FOR NONAQUEOUS ELECTROLYTE SECONDARY BATTERY, AND NONAQUEOUS ELECTROLYTE SECONDARY BATTERY

TECHNICAL FIELD

The present invention relates to a vinylidene fluoride copolymer composition and a method for producing the same, a polymer dispersion, an electrode for a non-aqueous electrolyte secondary battery, an electrolyte layer for a non-aqueous electrolyte secondary battery, and a non-aqueous electrolyte secondary battery.

BACKGROUND ART

A vinylidene fluoride polymer containing vinylidene fluoride is widely used as a binder for each layer of a non-aqueous electrolyte secondary battery. In particular, a copolymer of vinylidene fluoride and a fluorinated alkyl vinyl compound (hereinafter, also referred to as "vinylidene fluoride copolymer") is widely known as a binder for binding a current collector and an electrode active material or the like.

Here, Patent Document 1 discloses an example in which a vinylidene fluoride copolymer is used as a binder for an electrode layer or an electrolyte layer of an all-solid-state battery, which is a type of non-aqueous electrolyte secondary battery. In this case, the layer is generally formed by mixing the vinylidene fluoride copolymer with an electrode active material, a solid electrolyte, a solvent, a dispersion medium, or the like. In Patent Document 2, a solvent having a small dielectric constant is used for suppressing elution of lithium from a solid electrolyte.

However, since the vinylidene fluoride copolymer is an insulator, an ion conduction path is cut in the mixture, and the performance of the all-solid-state battery may not be sufficiently obtained. Patent Document 3 describes that ion conductivity decreases when a binder is mixed into a solid electrolyte layer.

Therefore, a technique for forming an electrode layer or an electrolyte layer by dispersing a vinylidene fluoride copolymer without dissolving the vinylidene fluoride copolymer has been studied. For example, Patent Documents 4 and 5 describe a slurry in which a vinylidene fluoride-hexafluoropropylene copolymer is dispersed in butyl butyrate or the like.

Furthermore, Patent Document 6 describes that, when a particulate binder polymer is uniformly dispersed in a dispersion medium, it is possible to carry out adhesion without coating a part of the surface or the entire surface with the solid electrolyte. This patent document indicates that, when such a binder dispersion is used, an increase in interface resistance between the solid electrolyte particles, between the solid electrolyte particles and the current collector, or the like can be suppressed, and that the binder dispersion and the solid electrolyte particles can be mixed and applied.

CITATION LIST

Patent Literature

Patent Document 1: JP 6257698 B
Patent Document 2: WO 2012/063827

Patent Document 3: JP 2008-103284 A
Patent Document 4: JP 2016-025025 A
Patent Document 5: JP 2016-025027 A
Patent Document 6: JP 2015-159067 A

SUMMARY OF INVENTION

Technical Problem

As described in Patent Document 3 indicated above, the vinylidene fluoride copolymer is an insulator, and thus may decrease ion conductivity when used as a binder for an electrode layer or an electrolyte layer.

Therefore, as described in Patent Documents 4 to 6, it has been studied to form an electrode layer or a solid electrolyte layer by dispersing a vinylidene fluoride copolymer without dissolving it.

For further improving the performance of the all-solid-state battery, a method for more uniformly dispersing a binder (vinylidene fluoride copolymer) in a polymer dispersion for forming an electrode layer or an electrolyte layer has been sought. Here, in the polymer dispersion for forming an electrode layer or an electrolyte layer, it is preferable that the vinylidene fluoride copolymer hardly precipitates over a long period of time. Accordingly, an object of the present invention is to provide a vinylidene fluoride copolymer composition whose dispersibility in a dispersion medium having a low relative dielectric constant is stable over a long period of time, and to provide a method for producing the same. Another object of the present invention is to provide a polymer dispersion containing the vinylidene fluoride copolymer composition, an electrode for a non-aqueous electrolyte secondary battery, an electrolyte layer for a non-aqueous electrolyte secondary battery, a non-aqueous electrolyte secondary battery, and the like.

Solution to Problem

The present invention provides the following vinylidene fluoride copolymer composition. Specifically, the present invention provides a vinylidene fluoride copolymer composition containing a vinylidene fluoride copolymer, the vinylidene fluoride copolymer including a structural unit derived from vinylidene fluoride and a structural unit derived from a fluorinated alkyl vinyl compound, in which the vinylidene fluoride copolymer composition has a melting point of 140° C. or lower, when a reversing heat flow of the vinylidene fluoride copolymer composition is measured with a temperature-modulated differential scanning calorimetry, the vinylidene fluoride copolymer composition has endothermic peaks having an amount of enthalpy of fusion ($\Delta Hm$) of 2 J/g or more, an absolute value of a difference between a peak top temperature of a largest endothermic peak among the endothermic peaks and the melting point of the vinylidene fluoride copolymer composition is 10° C. or lower, and after a dispersion containing butyl butyrate and the vinylidene fluoride copolymer composition and having a content rate of the vinylidene fluoride copolymer composition of 10 mass % is stirred at 25° C. for 30 minutes and left to stand for 20 hours, a content rate of the vinylidene fluoride copolymer composition in an upper 20 vol % of the dispersion is 4.0 mass % or more and 10 mass % or less.

The present invention also provides a polymer dispersion containing: the vinylidene fluoride copolymer composition described above; and a dispersion medium having a relative dielectric constant of 15 or less.

The present invention also provides an electrode for a non-aqueous electrolyte secondary battery containing the vinylidene fluoride copolymer composition described above. The present invention further provides an electrolyte layer for a non-aqueous electrolyte secondary battery containing the vinylidene fluoride copolymer composition described above. The present invention also provides a non-aqueous electrolyte secondary battery containing the vinylidene fluoride copolymer composition described above.

The present invention provides the following method for producing a vinylidene fluoride copolymer composition.

The present invention provides a method for producing a vinylidene fluoride copolymer composition, the vinylidene fluoride copolymer composition containing a vinylidene fluoride copolymer containing a structural unit derived from vinylidene fluoride and a structural unit derived from a fluorinated alkyl vinyl compound, the method including:

preparing an emulsion containing an untreated vinylidene fluoride copolymer dispersed in an aqueous medium; and obtaining a surfactant-containing emulsion having a surface tension of 40 mN/m or less at 25° C. by adding a surfactant and stirring into the emulsion, in which the vinylidene fluoride copolymer composition has a melting point of 140° C. or lower.

Also, the present invention provides a method for producing a vinylidene fluoride copolymer composition, the vinylidene fluoride copolymer composition containing a vinylidene fluoride copolymer containing a structural unit derived from vinylidene fluoride and a structural unit derived from a fluorinated alkyl vinyl compound, the method including:

preparing an emulsion containing an untreated vinylidene fluoride copolymer dispersed in an aqueous medium; and when measuring a heat flow of the untreated vinylidene fluoride copolymer with a differential scanning calorimeter, heating the emulsion at a temperature which is lower than an endset of a highest-temperature peak among endothermic peaks observed at 185° C. or lower and is 40° C. or higher, in which the vinylidene fluoride copolymer composition has a melting point of 140° C. or lower.

Advantageous Effects of Invention

The vinylidene fluoride copolymer composition of the present invention has very excellent dispersibility in a dispersion medium having a low relative dielectric constant. Therefore, the vinylidene fluoride copolymer composition enables formation of an electrode layer or an electrolyte layer uniformly containing the vinylidene fluoride copolymer composition.

BRIEF DESCRIPTION OF THE DRAWINGS

FIG. 1 is a graph for explaining a method for specifying an endset of an endothermic peak of a vinylidene fluoride copolymer.

DESCRIPTION OF EMBODIMENTS

1. Vinylidene Fluoride Copolymer Composition

A vinylidene fluoride copolymer composition according to an embodiment of the present invention is a composition containing a vinylidene fluoride copolymer having predetermined physical properties. Here, the vinylidene fluoride copolymer composition according to an embodiment of the present invention may be composed only of the vinylidene fluoride copolymer, or may contain a vinylidene fluoride copolymer and other components such as a surfactant.

The vinylidene fluoride copolymer composition according to an embodiment of the present invention may have a melting point of 140° C. or lower, and is usually in a solid state at 25° C. In the present specification, "the composition is in a solid state at 25° C." means that a main constituent component of the composition is in a solid state at 25° C., and the composition may partially contain a component in a liquid state to the extent that the objects and effects of the present invention are not impaired.

As described above, when an electrode layer or an electrolyte layer of a non-aqueous electrolyte secondary battery is formed, the vinylidene fluoride copolymer is preferably dispersed in a dispersion medium (a dispersion medium having a low relative dielectric constant), and the dispersibility thereof is preferably maintained over a long period of time. As a result of intensive studies by the present inventors, it has been found that, when the vinylidene fluoride copolymer composition has specific physical properties, the composition is easily dispersed in a dispersion medium having a low relative dielectric constant, and high dispersion stability is also achieved when a dispersion of the vinylidene fluoride copolymer composition is left to stand.

Specifically, it has been found that, when the vinylidene fluoride copolymer composition has a melting point of 140° C. or lower, and has endothermic peaks having an amount of enthalpy of fusion (ΔHm) of 2 J/g or more when a reversing heat flow of the vinylidene fluoride copolymer composition is measured with a temperature-modulated differential scanning calorimetry, and an absolute value of a difference between a peak top temperature of a largest endothermic peak and the melting point of the vinylidene fluoride copolymer composition is 10° C. or lower, the dispersibility of the vinylidene fluoride copolymer composition is improved in a dispersion medium having a relative dielectric constant of 15 or less.

The fact that the vinylidene fluoride copolymer composition has a melting point of 140° C. or lower means that the vinylidene fluoride copolymer includes a certain amount or more of a structural unit derived from a fluorinated alkyl vinyl compound. In addition, it is considered that, when the vinylidene fluoride copolymer composition includes a structural unit derived from a fluorinated alkyl vinyl compound, good compatibility with a dispersion medium having a low relative dielectric constant can be readily obtained.

In addition, in a vinylidene fluoride copolymer composition containing a vinylidene fluoride copolymer in which a structural unit derived from vinylidene fluoride and a structural unit derived from a fluorinated alkyl vinyl compound have a certain composition ratio, the peak top temperature of the largest endothermic peak in the reversing heat flow varies depending on the state of a crystalline region of the vinylidene fluoride copolymer in the vinylidene fluoride copolymer composition. Since the state of the crystalline region of the vinylidene fluoride copolymer varies depending on polymerization conditions such as thermal history (temperature, time) and reaction rate of the monomer and equipment, the peak top temperature is a value reflecting production history. Meanwhile, in the vinylidene fluoride copolymer composition, the melting point measured by the method which will be described later is hardly affected by the state of the crystalline region formed during production. When the vinylidene fluoride copolymer is appropriately crystallized without impairing the compatibility with the dispersion medium having a low relative dielectric constant, the absolute value of the difference between the peak top temperature and the melting point of the vinylidene fluoride copolymer composition is 10° C. or lower. That is, when the absolute value is 10° C. or lower, it can be said that the vinylidene fluoride copolymer composition is easily dispersed in a solvent having a low relative dielectric constant.

In the present invention, when a dispersion containing butyl butyrate and the vinylidene fluoride copolymer composition and having a content rate of the vinylidene fluoride copolymer composition of 10 mass % is prepared, a content rate of the vinylidene fluoride copolymer composition in an upper 20 vol % of the dispersion after the dispersion is stirred at 25° C. for 30 minutes and left to stand for 20 hours is 4.0 mass % or more and 10 mass % or less. When the content rate of the vinylidene fluoride copolymer composition in the dispersion falls within the above range, the composition hardly precipitates in a dispersion medium having a low relative dielectric constant, and the dispersibility is favorably maintained over a long period of time.

Hereinafter, components of the vinylidene fluoride copolymer composition, physical properties thereof, production methods therefor, and the like will be described in detail.

Vinylidene Fluoride Copolymer

The vinylidene fluoride copolymer contained in the vinylidene fluoride copolymer composition according to an embodiment of the present invention includes a constituent unit derived from vinylidene fluoride and a structural unit derived from a fluorinated alkyl vinyl compound. An amount of the structural unit derived from the vinylidene fluoride contained in the vinylidene fluoride copolymer is preferably 30 mass % or more and 85 mass % or less, and more preferably 40 mass % or more and 80 mass % or less, per 100 mass % of the structural units of the vinylidene fluoride copolymer. When a mass fraction of a constituent unit derived from the vinylidene fluoride falls within the above range, the melting point of the vinylidene fluoride copolymer composition tends to fall within a desired range. The mass fraction of the constituent unit derived from the vinylidene fluoride can be specified by analysis of the vinylidene fluoride copolymer by $^{19}$F-NMR.

Meanwhile, the fluorinated alkyl vinyl compound may be a compound having one vinyl group and an alkyl group in which one or more hydrogen atoms of the alkyl group are substituted with fluorine, or a compound having one vinyl group and fluorine bonded to the vinyl group (however, excluding vinylidene fluoride), and examples thereof include vinyl fluoride, trifluoroethylene, tetrafluoroethylene, chlorotrifluoroethylene, hexafluoropropylene, hexafluoroethylene, fluoroalkyl vinyl ether, and perfluoromethyl vinyl ether. Among these, tetrafluoroethylene and hexafluoropropylene are preferable, and hexafluoropropylene is particularly preferable from the perspective that good compatibility with a dispersion medium having a low relative dielectric constant can be readily obtained. In the vinylidene fluoride copolymer, only one type of constituent unit derived from the fluorinated alkyl vinyl compound may be contained, or two or more types thereof may be contained.

An amount of the structural unit derived from the fluorinated alkyl vinyl compound in the vinylidene fluoride copolymer is not particularly limited as long as the melting point of the vinylidene fluoride copolymer composition which will be described later can be set to 140° C. or lower. Although depending on the type of fluorinated alkyl vinyl compound, the amount of the structural unit derived from the fluorinated alkyl vinyl compound is preferably 15 mass % or more and 70 mass % or less, and more preferably 20 mass % or more and 60 mass % or less, per 100 mass % of the structural units of the vinylidene fluoride copolymer. When the amount of the fluorinated alkyl vinyl compound in the vinylidene fluoride copolymer is within the above range, the melting point of the vinylidene fluoride copolymer composition tends to fall within the desired range. The mass fraction of the constituent unit derived from the fluorinated alkyl vinyl compound can be specified by analyzing the vinylidene fluoride copolymer by $^{19}$F-NMR.

The vinylidene fluoride copolymer may partially include a structural unit derived from another monomer copolymerizable with the vinylidene fluoride or fluorinated alkyl vinyl compound as long as the objects and effects of the present invention are not impaired.

Examples of such another monomer copolymerizable with the vinylidene fluoride or the like include a crosslinkable alkyl vinyl compound having one vinyl group and a crosslinkable group. Examples of the crosslinkable group also include vinyl groups. That is, the crosslinkable alkyl vinyl compound may be, for example, a compound having two or more vinyl groups. The crosslinkable alkyl vinyl compound preferably contains a fluorine atom. Examples of the crosslinkable alkyl vinyl compound include perfluoro divinyl ether and perfluoroalkylene divinyl ether. Note that, examples of the perfluoroalkylene divinyl ether include a compound having a structure in which two vinyl ether groups, in which all hydrogen atoms are replaced with fluorine atoms, are bonded by a linear or branched divalent perfluoroalkylene group having from 1 to 6 carbons.

Examples of such another monomer also include an unsaturated dibasic acid or an unsaturated dibasic acid monoester. The unsaturated dibasic acid is unsaturated dicarboxylic acid or derivative thereof, and examples thereof include compounds with two carboxyl groups bonded by a linear or branched unsaturated alkylene group having from 1 to 6 carbon atoms. More specific examples of the unsaturated dibasic acid include maleic acid, fumaric acid, itaconic acid, and citraconic acid. On the other hand, the unsaturated dibasic acid monoester is a monoester compound derived from the unsaturated dibasic acid. Examples of the unsaturated dibasic acid monoester include maleic acid monomethyl ester, maleic acid monoethyl ester, citraconic acid monomethyl ester, and citraconic acid monoethyl ester.

Examples of such another monomer also include a compound containing a vinyl group and a polar group (hereinafter also referred to as "polar group-containing compound"). Examples of the polar group-containing compound include (meth)acrylic acid, 2-carboxyethyl(meth)acrylate, (meth)acryloyloxyethyl succinic acid, (meth)acryloyloxypropyl succinic acid, and glycidyl(meth)acrylate.

The mass fraction of the constituent unit derived from the crosslinkable alkyl vinyl compound, the unsaturated dibasic acid, the unsaturated dibasic acid monoester, or the polar group-containing compound in the vinylidene fluoride copolymer can be optionally set as long as the objects and effects of the present invention are not impaired. For example, an amount of the introduced constituent unit derived from the unsaturated dibasic acid, the unsaturated dibasic acid monoester, or the polar group-containing compound can be specified by FT-IR analysis of the vinylidene fluoride copolymer.

A weight average molecular weight of the vinylidene fluoride copolymer is preferably 100,000 to 10,000,000, more preferably 200,000 to 5,000,000, and still more preferably 300,000 to 2,000,000. When the weight average molecular weight of the vinylidene fluoride copolymer falls within this range, good dispersibility of the vinylidene fluoride copolymer composition in the dispersion medium can be readily obtained. In addition, when the vinylidene fluoride copolymer composition is used as a binder for an electrode layer or an electrolyte layer of an all-solid-state battery, the composition easily binds an active material or a solid electrolyte. The weight average molecular weight is a value measured by gel permeation chromatography (GPC) calibrated with polystyrene.

Surfactant

As described above, the vinylidene fluoride copolymer composition may further contain a surfactant in addition to the vinylidene fluoride copolymer.

Here, the surfactant contained in the vinylidene fluoride copolymer composition may be an ionic surfactant having an anionic group or a cationic group, or may be a non-ionic surfactant. In addition, the surfactant may be a non-fluorinated surfactant which does not contain fluorine, or may be a fluorinated surfactant (a perfluorinated surfactant, a partially fluorinated surfactant, and the like) which contains fluorine.

The anionic surfactant that can be used is not particularly limited, and known anionic surfactants can be used. A hydrophilic group of the anionic surfactant preferably contains a carboxylate, a sulfate, a sulfonate, a phosphate, or the like, and may further contain an ester bond, an acid amide bond, or an ether bond. A hydrophobic group preferably contains an alkyl chain, an alkyl ether chain, a perfluoroalkyl chain, a perfluoroalkyl ether chain, a fluorocarbon chain, or a fluoropolyether chain, which may have a linear structure or a branched structure.

The cationic surfactant that can be used is not particularly limited, and known surfactants can be used. A hydrophilic group of the cationic surfactant preferably contains an aliphatic quaternary ammonium salt, an aliphatic amine salt, a cyclic quaternary ammonium salt, or an amine acetate. A hydrophobic group preferably contains an alkyl chain, an alkyl ether chain, a perfluoroalkyl chain, a perfluoroalkyl ether chain, a fluorocarbon chain, or a fluoropolyether chain, which may have a linear structure or a branched structure.

Further, the non-ionic surfactant that can be used is not particularly limited, and known non-ionic surfactants can be used. A hydrophilic group of the non-ionic surfactant preferably has a hydroxy group, an ether bond, an acid amide bond, an ester bond or the like in the molecule. A hydrophobic group preferably contains an alkyl chain, an alkyl ether chain, a perfluoroalkyl chain, a perfluoroalkyl ether chain, a fluorocarbon chain, or a fluoropolyether chain, which may have a linear structure or a branched structure.

The surfactant is preferably soluble or miscible in an aqueous medium in the emulsion prepared in the method for producing a vinylidene fluoride copolymer composition which will be described below.

An amount of the surfactant contained in the vinylidene fluoride copolymer composition is preferably 0.01 mass % or more and 20 mass % or less, and more preferably 0.02 mass % or more and 15 mass % or less relative to a total amount of the vinylidene fluoride copolymer and the surfactant. An excessively large amount of the surfactant may decrease the adhesiveness between the vinylidene fluoride copolymer composition and an active material, an electrolyte, or the like when the obtained vinylidene fluoride copolymer composition is used as a binder for an electrode layer or an electrolyte layer, but, when the amount of the surfactant is 20 mass % or less, the adhesiveness is hardly decreased. On the other hand, when the amount of the surfactant is 0.01 mass % or more relative to the total amount of the vinylidene fluoride copolymer composition, the dispersion stability when the vinylidene fluoride copolymer composition is dispersed in the dispersion medium is enhanced.

<Physical Properties of Vinylidene Fluoride Copolymer Composition>

As described above, the vinylidene fluoride copolymer composition according to an embodiment of the present invention may have a melting point of 140° C. or lower, but the melting point is preferably 135° C. or lower, and more preferably 130° C. or lower. The melting point of the vinylidene fluoride copolymer composition can be controlled, for example, by the amount of the structural unit derived from the fluorinated alkyl vinyl compound in the vinylidene fluoride copolymer described above. In the present specification, the melting point of the vinylidene fluoride copolymer composition is measured by the following method. First, a powdery vinylidene fluoride copolymer composition is pressed at 200° C., and molded into a film having a thickness of 150 μm. The melting point of the pressed filmy vinylidene fluoride copolymer composition is measured using a differential scanning calorimeter in accordance with ASTM D3418. The melting point of the vinylidene fluoride copolymer composition measured by this method is a value measured after once melting the vinylidene fluoride copolymer composition. Therefore, it is hardly affected by the production history in a polymerization reaction process of the vinylidene fluoride copolymer and the method for producing a vinylidene fluoride copolymer composition, which will be described below.

Meanwhile, the vinylidene fluoride copolymer composition according to an embodiment of the present invention has endothermic peaks having an amount of enthalpy of fusion (ΔHm) of 2 J/g or more when a reversing heat flow of the vinylidene fluoride copolymer composition is measured with a temperature-modulated differential scanning calorimetry. Since the document value (value described in M Neidhofer: Polymer volume45, Issue 5, 2004, 1679-1688) of a standard amount of enthalpy of fusion ($\Delta Hm^0$) of the vinylidene fluoride polymer is 104.5 J/g, an upper limit of the amount of enthalpy of fusion (ΔHm) of the vinylidene fluoride copolymer is set to 104.5 J/g. Here, the amount of enthalpy of fusion (ΔHm), the number of endothermic peak tops, and peak top temperatures of the vinylidene fluoride copolymer composition vary depending on the state of the crystalline region of the vinylidene fluoride copolymer composition (in particular, vinylidene fluoride copolymer), that is, the production method which will be described below. For example, when a surfactant is optionally added to an emulsion containing a vinylidene fluoride copolymer having one endothermic peak top, and the emulsion is heated at a predetermined temperature, the vinylidene fluoride copolymer has two or more endothermic peak tops. This is because the crystal structure of the vinylidene fluoride copolymer is changed by heating the emulsion and appears as a peak different from a melting peak derived from the vinylidene fluoride copolymer before heating. In the present specification, the endothermic peak having an amount of enthalpy of fusion (ΔHm) of 2 J/g or more is a peak observed at a temperature of 0° C. or higher, and a peak observed in a temperature range of lower than 0° C. is not included in the endothermic peak.

Here, the reversing heat flow of the vinylidene fluoride copolymer composition is determined by a temperature-modulated differential scanning calorimetry. Specifically, a powdery vinylidene fluoride copolymer composition obtained by freeze-drying an emulsion containing the vinylidene fluoride copolymer composition is used as a measurement sample. Heating is performed at an underlying heating rate of 5° C./min, a modulation period of 40 seconds, and a modulation amplitude of ±0.531° C. for achieving the heat-only condition, and a reversing heat flow having downwardly convex endothermic peaks is obtained. In the obtained reversing heat flow, a base line is linearly drawn in such a manner that it overlaps with a linear heat flow on a higher temperature side than the endset. Among the downwardly convex endothermic peaks of the reversing heat flow, when a line is drawn vertically from the base line toward the reversing heat flow, a point at which the distance from the base line to the reversing heat flow is the longest is set as the peak top of the largest endothermic peak, and the temperature at which the peak top is obtained is specified. Here, the number of minimum values in the downwardly convex endothermic peaks of the reversing heat flow is defined as the number of peak tops of the endothermic peaks. Meanwhile, an area surrounded by the base line and the reversing heat flow is defined as the amount of enthalpy of fusion (ΔHm).

In the vinylidene fluoride copolymer composition according to an embodiment of the present invention, the absolute value of the difference between the peak top temperature of the largest endothermic peak among the endothermic peaks of the vinylidene fluoride copolymer having an amount of enthalpy of fusion (ΔHm) of 2 J/g or more and the melting point of the vinylidene fluoride copolymer composition is 10° C. or lower. Here, the "peak top temperature of the largest endothermic peak" is a temperature (point on the reversing heat flow) at which the distance from the base line to the reversing heat flow is maximum when a line is drawn vertically from the base line drawn by the above-described method toward the reversing heat flow in the endothermic peak having an amount of enthalpy of fusion (ΔHm) of 2 J/g or more. The absolute value is more preferably 9.5° C. or lower, and still more preferably 9° C. or lower. When the absolute value falls within this range, the vinylidene fluoride copolymer composition has both compatibility with and dispersibility in a dispersion medium having a low relative dielectric constant as described above. When the absolute value exceeds 10° C., the crystallinity of the vinylidene fluoride copolymer composition tends to be excessively increased, and the dispersibility tends to be lowered. The absolute value can be controlled by the method for producing a vinylidene fluoride copolymer composition which will be described later. For example, when the vinylidene fluoride copolymer is solidified (powdered) and then heated, the absolute value is likely to exceed 10° C.

In the vinylidene fluoride copolymer composition according to an embodiment of the present invention, when a dispersion containing butyl butyrate and the vinylidene fluoride copolymer composition and having a content rate of the vinylidene fluoride copolymer composition of 10 mass % is prepared, a content rate of the vinylidene fluoride copolymer composition in an upper 20 vol % of the dispersion after the dispersion is left to stand for 20 hours is 4.0 mass % or more and 10 mass % or less. The content rate of the vinylidene fluoride copolymer composition in the upper 20 vol % is more preferably 7.0 mass % or more and 10 mass % or less. When the vinylidene fluoride copolymer composition has such dispersion stability with respect to butyl butyrate, the vinylidene fluoride copolymer composition hardly precipitates in a polymer dispersion or the like for forming an electrode layer, an electrolyte layer, or the like, and an electrode layer or an electrolyte layer having desired performance is easily obtained. The content rate of the vinylidene fluoride copolymer composition in the dispersion after the dispersion is left to stand can be controlled by the method for producing a vinylidene fluoride copolymer composition which will be described below. For example, it can be controlled by the amount and type of surfactant to be mixed with the vinylidene fluoride copolymer, whether or not the emulsion is heated, and the like.

Here, the content rate of the vinylidene fluoride copolymer composition after the dispersion is left to stand is measured as follows. A dispersion in which the vinylidene fluoride copolymer composition is added to butyl butyrate (content rate of the vinylidene fluoride copolymer composition: 10 mass %) is prepared. The dispersion (20 mL) is placed in a 20 mL graduated cylinder, and the graduated cylinder is covered with parafilm, and left to stand for 20 hours. Thereafter, 4 mL is collected from a supernatant in the graduated cylinder, dried at 135° C. for 1 hour, and allowed to cool in a desiccator for 1 hour. Then, by measuring the weights before and after drying, the content rate of the vinylidene fluoride copolymer composition in the upper 20 vol % of the dispersion is calculated.

Further, haze of the dispersion is preferably 5% or over. When the haze of the dispersion is less than 5%, the vinylidene fluoride copolymer composition is dissolved in the dispersion medium, and, when the haze is 5% or over, at least a part of the vinylidene fluoride copolymer composition is dispersed without being dissolved in the dispersion medium. The haze can be controlled by the type of surfactant used when preparing the vinylidene fluoride copolymer composition, whether or not heating is performed, and the like. The haze of the dispersion is measured by the following method. A butyl butyrate dispersion of the vinylidene fluoride copolymer composition (content rate of the vinylidene fluoride copolymer composition: 10 mass %) is prepared, left to stand for 20 hours, and then stirred. The haze of the dispersion immediately after stirring is measured in accordance with JIS K 7136.

The shape of the vinylidene fluoride copolymer composition according to an embodiment of the present invention is not particularly limited, but is usually preferably in the form of particles (powder). The average secondary particle diameter of the vinylidene fluoride copolymer composition is not particularly limited, but is preferably 1 μm or greater and 5000 μm or less, and more preferably 2 μm or greater and 3000 μm or less. When the average secondary particle diameter of the vinylidene fluoride copolymer composition falls within the above range, the vinylidene fluoride copolymer is easily handled. The average secondary particle diameter is a median diameter (D50) of a volume-based particle size distribution as measured by a laser diffraction/scattering method.

<Method for Producing Vinylidene Fluoride Copolymer Composition>

The vinylidene fluoride copolymer composition satisfying the physical properties can be produced, for example, by the following three methods. However, the method for producing the vinylidene fluoride copolymer composition is not limited to the following three methods.

First Method

The first method for producing the vinylidene fluoride copolymer composition includes: preparing an emulsion containing an untreated vinylidene fluoride copolymer that is dispersed in an aqueous medium (hereinafter also referred to as "emulsion preparation"); and obtaining a surfactant-containing emulsion having a surface tension of 40 mN/m or less at 25° C. by adding an ionic surfactant and stirring into the emulsion (hereinafter also referred to as "surfactant addition").

After the surfactant addition, drying the surfactant-containing emulsion and extracting the vinylidene fluoride copolymer (hereinafter also referred to as "drying") produces the vinylidene fluoride copolymer composition in a solid state. In this method, after the vinylidene fluoride copolymer composition in a solid state is obtained, heating at a temperature equal to or higher than the melting point of the vinylidene fluoride copolymer composition is not performed. Each step will be described below.

Emulsion Preparation

In the emulsion preparation, an emulsion in which an untreated vinylidene fluoride copolymer is dispersed in an aqueous medium is prepared. The emulsion may be a commercially available product. In the present specification, the untreated vinylidene fluoride copolymer refers to a copolymer of vinylidene fluoride and a fluorinated alkyl vinyl compound prepared by a general method, and also refers to a copolymer that has not been subjected to heat treatment, mixing with a surfactant, or the like other than for the purpose of decomposing a residual monomer or a residual initiator after polymerization of the vinylidene fluoride copolymer. The untreated vinylidene fluoride copolymer has substantially the same composition as the vinylidene fluoride copolymer. However, the dispersibility of the untreated vinylidene fluoride copolymer in a dispersion medium having a relative dielectric constant of 15 or less is changed by performing a surfactant addition or the like which will be described below on an emulsion in which the untreated vinylidene fluoride copolymer is dispersed in an aqueous medium.

In this step, the emulsion in which the untreated vinylidene fluoride copolymer is dispersed in the aqueous medium may be prepared by a suspension polymerization method, an emulsion polymerization method, a solution polymerization method, a microsuspension polymerization method, or the like. Also, a commercially available product of an emulsion in which an untreated vinylidene fluoride copolymer is dispersed in an aqueous medium may be used. Especially, a method for obtaining an emulsion in which an untreated vinylidene fluoride copolymer is dispersed in water by an emulsion polymerization method is preferable.

As a specific emulsion polymerization method, vinylidene fluoride, a fluorinated alkyl vinyl compound, another monomer if needed, an aqueous medium, and an emulsifier are mixed in an autoclave. Then, a polymerization initiator soluble in an aqueous medium is added to the mixed liquid, and vinylidene fluoride, a fluorinated alkyl vinyl compound, and another monomer if needed are polymerized.

The pressure in the autoclave during polymerization is preferably from 0 to 20 MPa, more preferably from 0.5 to 15 MPa, and even more preferably from 1 to 10 MPa. By adjusting the pressure during the polymerization to fall within the range described above, an untreated vinylidene fluoride copolymer can be obtained stably in terms of production.

The aqueous medium used in the emulsion polymerization is not particularly limited as long as it is a liquid in which the vinylidene fluoride and the fluorinated alkyl vinyl compound are hardly soluble, and may contain a solvent miscible with water in addition to water as long as it is a liquid containing water as a main component. The aqueous medium is preferably water.

Meanwhile, the emulsifier is not particularly limited as long as it is capable of forming micelles in an aqueous medium and capable of stably dispersing the untreated vinylidene fluoride copolymer in the aqueous medium, and, for example, a known surfactant can be used. The emulsifier may be a non-ionic surfactant, a cationic surfactant, an anionic surfactant, or an amphoteric surfactant, or these may be used in combination. Examples of the emulsifier include a perfluorinated surfactant, a partially fluorinated surfactant, and a non-fluorinated surfactant, which are used in the polymerization of polyvinylidene fluoride in the related art. Among the surfactants, perfluoroalkyl sulfonic acid and a salt thereof, perfluoroalkyl carboxylic acid and a salt thereof, and a fluorine-based surfactant having a fluorocarbon chain or a fluoropolyether chain are preferable. As the emulsifier, one selected from the above emulsifiers can be used alone, or two or more thereof can be used. The added amount of the emulsifier is preferably from 0.0001 to 22 parts by mass when the total amount of monomers used in the polymerization is 100 parts by mass.

The polymerization initiator is not particularly limited as long as the polymerization initiator is a compound that is soluble in the aqueous medium and that can polymerize a monomer. Examples of the polymerization initiator include known a water-soluble peroxide, a water-soluble azo-based compound, and a redox initiator. Examples of the water-soluble peroxide include ammonium persulfate and potassium persulfate. Examples of the water-soluble azo compound include 2,2'-azobis-isobutyronitrile (AIBN) and 2,2'-azobis-2-methylbutyronitrile (AMBN). Examples of the redox initiator include ascorbic acid-hydrogen peroxide. Among these, the water-soluble peroxide is preferable from the perspective of reactivity and the like. These polymerization initiators may be used alone or as a combination of two or more types. The added amount of the polymerization initiator is preferably from 0.01 to 5 parts by mass when the total amount of monomers used in the polymerization is 100 parts by mass.

Meanwhile, the emulsion polymerization method may be a soap-free emulsion polymerization method, a mini-emulsion polymerization method, a seed emulsion polymerization or the like. The soap-free emulsion polymerization method is a method of emulsion polymerization without using an ordinary emulsifier as described above. In addition, in the soap-free emulsion polymerization method, as the emulsifier, a reactive emulsifier having a polymerizable double bond in the molecule. The reactive emulsifier forms the micelles in the system at the beginning of the polymerization; however, as the polymerization proceeds, the reactive emulsifier is used as a monomer in the polymerization reaction and consumed. Therefore, there is almost no free state in the final resulting reaction system. Therefore, there is an advantage that the reactive emulsifier is difficult to bleed out to the particle surface of the obtained untreated vinylidene fluoride copolymer.

Examples of the reactive emulsifier include polyoxyalkylene alkenyl ether, sodium alkyl allyl sulfosuccinate, methacryloyloxy polyoxypropylene sodium sulfate, and alkoxy polyethylene glycol methacrylate.

In addition, the mini-emulsion polymerization method is a method in which a strong shearing force is applied using an ultrasonic generator or the like to reduce the size of oil droplets of a monomer, such as vinylidene fluoride or a fluorinated alkyl vinyl compound, to a submicron size, and the monomer is polymerized. In this case, a known hydrophobe is added to the mixed solution to stabilize the submicron-sized oil droplets of the monomer. In the mini-emulsion polymerization method, a polymerization reaction ideally occurs only in each monomer oil droplet, and each oil droplet becomes an untreated vinylidene fluoride copolymer (fine particles). Therefore, the particle diameter, particle diameter distribution, and the like of the obtained untreated vinylidene fluoride copolymer are easily controlled.

Seed emulsion polymerization is a polymerization performed by coating the fine particle obtained by the above-described polymerization method with a polymer formed from other monomers. A monomer and, if needed, an aqueous medium, a surfactant, a polymerization initiator, or the like are further added to the fine particle emulsion and polymerized.

Here, in any of the emulsion polymerization methods described above, a chain transfer agent may be used to adjust a degree of polymerization of the untreated vinylidene fluoride copolymer produced. Examples of the chain transfer agent include ethyl acetate, methyl acetate, diethyl carbonate, acetone, ethanol, n-propanol, acetaldehyde, propylaldehyde, ethyl propionate, and carbon tetrachloride.

Additionally, if needed, a pH buffer may be used. Examples of the pH buffer include an electrolyte substance having a buffer capacity such as sodium dihydrogen phosphate, disodium hydrogen phosphate, and potassium dihydrogen phosphate; and a basic substrate such as sodium hydroxide, potassium hydroxide, barium hydroxide, calcium hydroxide, and ammonia.

An additional optional component such as an anti-settling agent, a dispersion stabilizer, a corrosion inhibitor, an anti-fungal agent, and a wetting agent may be used, if needed. An amount of the additional optional component is preferably 5 ppm or more and 10 parts by mass or less and more preferably 10 ppm or more and 7 parts by mass or less per 100 parts by mass of the total amount of all monomers used in the polymerization.

In the polymerization of the untreated vinylidene fluoride copolymer, the polymerization temperature may be selected appropriately depending on a factor such as the type of polymerization initiator. For example, the temperature may be set to from 0° C. to 120° C., preferably from 20° C. to 110° C., and more preferably from 40° C. to 100° C. Although the polymerization time is not particularly limited, the polymerization time is preferably from 1 to 24 hours considering the productivity.

According to the production method according to an embodiment of the present invention, in a case where the aqueous medium is water, an emulsion in which the untreated vinylidene fluoride copolymer particles are uniformly dispersed in water can be obtained. The commercially available emulsion and the emulsion thus obtained may be used as they are or may be used after being diluted with an aqueous medium to an arbitrary concentration. The emulsion may be made into a powder by at least one method selected from salting out, freeze crushing, spray drying, freeze drying, and the like, and then physically or chemically redispersed in a desired aqueous medium, and then the surfactant addition which will be described later may be performed. At this time, other optional components (excluding the surfactant) may be mixed at any timing, or impurities may be removed from the untreated emulsion by a dialysis membrane, an ion exchange resin, or the like. Furthermore, the untreated vinylidene fluoride copolymer may be subjected to pulverization treatment by freeze crushing, classification, or the like, then mixed with an aqueous medium, and subjected to the surfactant addition which will be described later. The method for dispersing the untreated vinylidene fluoride copolymer in the aqueous medium is not particularly limited, and a known dispersion method can be applied.

Here, a content of the untreated vinylidene fluoride copolymer in the emulsion is preferably 5 mass % or more and 70 mass % or less, and more preferably 10 mass % or more and 60 mass % or less. The emulsion purchased or prepared by the method described above may be used as it is, or may be used after being diluted with an aqueous medium. When the content of the untreated vinylidene fluoride copolymer is 5 mass % or more, the vinylidene fluoride copolymer composition can be efficiently prepared. Meanwhile, when the content is 70 mass % or less, the dispersibility of the emulsion is easily stabilized.

An average primary particle diameter of the untreated vinylidene fluoride copolymer in the emulsion determined by a dynamic light scattering method is preferably 5 μm or less, more preferably 3 μm or less, and even more preferably 1 μm or less. On the other hand, the average primary particle size is preferably 0.01 μm or greater, 0.05 μm or greater, and even more preferably 0.1 μm or greater. The average primary particle diameter of the untreated vinylidene fluoride copolymer in the emulsion is calculated by regularization analysis by a dynamic light scattering method. For example, the average primary particle diameter can be measured in accordance with JIS Z 8828 by DelsaMax CORE available from BECKMAN COULTER Inc. at a measurement temperature of 25° C. using water as a measurement medium. In addition, the largest peak obtained by regularization analysis is defined as the average primary particle size.

Surfactant Addition

In the surfactant addition, an ionic surfactant is added and stirred into the emulsion prepared in the emulsion preparation to obtain a surfactant-containing emulsion having a surface tension of 40 mN/m or less at 25° C. The ionic surfactant to be added in this step is not particularly limited as long as the surface tension of the emulsion (surfactant-containing emulsion) after the addition can be set to 40 mN/m or less. The surface tension at 25° C. of the emulsion (surfactant-containing emulsion) after the addition of the ionic surfactant are preferably 5 mN/m or greater and 40 mN/m or less, and more preferably 10 mN/m or greater and 40 mN/m or less.

The surface tension of the surfactant-containing emulsion is measured with a surface tensiometer (Sigma 701/700, available from KSV instruments) using the Wilhelmy method. For the measurement, a platinum plate is used, and an average value when the surface tension at 25° C. is measured 3 times is defined as a value of the surface tension.

As the ionic surfactant to be added in this step, an ionic surfactant soluble or miscible in the aqueous medium contained in the emulsion is selected, and the ionic surfactant may be either an anionic surfactant or a cationic surfactant, and is particularly preferably an anionic surfactant. Only one of the surfactants may be added, or two or more thereof may be added in combination. By adding the ionic surfactant, it can be adsorbed on the surface of the untreated vinylidene fluoride copolymer contained in the emulsion, and the dispersibility in the dispersion medium having a relative dielectric constant of 15 or less is improved.

The anionic surfactant and cationic surfactant that can be used are the same as those exemplified as the surfactant contained in the vinylidene fluoride copolymer composition described above.

An amount of the ionic surfactant to be added is appropriately selected according to the surface tension of the surfactant-containing emulsion, and, usually, is preferably 0.01 parts by mass or more and 20 parts by mass or less, and more preferably 0.02 parts by mass or more and 15 parts by mass or less relative to the total amount of the untreated vinylidene fluoride copolymer in the emulsion. An excessively large amount of the ionic surfactant may decrease the adhesiveness between the vinylidene fluoride copolymer composition and an active material, an electrolyte, or the like when the obtained vinylidene fluoride copolymer composition is used as a binder for an electrode layer or an electrolyte layer. Therefore, the amount is preferably 20 parts by mass or less per 100 parts by mass of the total amount of the untreated vinylidene fluoride copolymer. On the other hand, when the amount of the ionic surfactant is 0.01 parts by mass or more relative to the total amount of the untreated vinylidene fluoride copolymer, the dispersion stability when the vinylidene fluoride copolymer composition is dispersed in the dispersion medium is enhanced. An excess component of the surfactant added in this step may be removed by a dialysis membrane, an ion exchange resin, or the like, if needed.

Drying

In the drying, the aqueous medium is removed from the surfactant-containing emulsion. Although the method for removing the aqueous medium is not particularly limited, it is preferable to perform drying at a temperature that does not affect the physical properties and the like of the vinylidene fluoride copolymer composition in the surfactant-containing emulsion. The drying may be performed under atmospheric pressure or under reduced pressure. The drying produces the vinylidene fluoride copolymer composition in a solid state (powder form) described above. In addition, an apparatus for removing the aqueous medium is not particularly limited, and a shelf dryer, a conical dryer, a fluidized bed dryer, a flash dryer, a spray dryer, a freeze dryer, or the like can be used.

Second Method

The second method for producing the vinylidene fluoride copolymer composition includes, at least: preparing an emulsion in which an untreated vinylidene fluoride copolymer is dispersed in an aqueous medium (hereinafter also referred to as "emulsion preparation"); and heating the emulsion at a temperature which is lower than an endset of a highest-temperature peak among endothermic peaks of the untreated vinylidene fluoride copolymer observed at 185° C. or lower, when a heat flow of the untreated vinylidene fluoride copolymer is measured with a differential scanning calorimeter (hereinafter also referred to as "heating"). After the emulsion heating, drying the surfactant-containing emulsion and extracting the vinylidene fluoride copolymer (hereinafter also referred to as "drying") produces the vinylidene fluoride copolymer composition in a solid state (powder form) described above. Also in this method, after the vinylidene fluoride copolymer composition in a solid state is obtained, heating at a temperature equal to or higher than the melting point of the vinylidene fluoride copolymer composition is not performed. Each step will be described below.

Emulsion Preparation

In the emulsion preparation, an emulsion in which an untreated vinylidene fluoride copolymer is dispersed in an aqueous medium is prepared. The emulsion preparation can be the same as the emulsion preparation of the first method described above. As described above, a commercially available emulsion may be used.

Heating

In the heating, the emulsion is heated after the emulsion preparation. When the polymerization is performed in the emulsion preparation, the heating may be carried out continuously after the polymerization, or the polymerization and the heating may be separately carried out. When the emulsion obtained by the polymerization is heated, at least the unreacted vinylidene fluoride and the fluorinated alkyl vinyl compound are preferably purged and removed from the system after the polymerization and before the heating. By performing this operation, the polymerization reaction for forming the vinylidene fluoride copolymer does not start again during the heating. In addition, the state of the crystalline region of the untreated vinylidene fluoride copolymer is easily controlled in the heating.

The temperature at which the emulsion is heated is determined as follows. First, a part of the untreated vinylidene fluoride copolymer is made into a powder and then formed into a film. The heat flow of the filmy untreated vinylidene fluoride copolymer is measured using a differential scanning calorimeter in accordance with ASTM D3418. Among the endothermic peaks of the vinylidene fluoride copolymer observed at 185° C. or lower, the temperature lower than the endset of the highest-temperature peak is defined as the heating temperature. By performing the heating, the dispersibility in a dispersion medium having a relative dielectric constant of 15 or less is improved.

More specifically, a method for determining the temperature at which the emulsion is heated is as follows. First, the emulsion is freeze-dried, and the untreated vinylidene fluoride copolymer is powdered. Then, a mold having a length of 5 cm× a width of 5 cm× a thickness of 150 μm and about 1 g of the powdery untreated vinylidene fluoride copolymer are sandwiched between two aluminum foils sprayed with a release agent, and pressed at 200° C., and formed into a film. Then, a heat flow of the filmy untreated vinylidene fluoride copolymer is obtained by a method in accordance with ASTM D 3418 using a differential scanning calorimeter ("DSC-1" available from METTLER). Then, an endset of a highest-temperature peak among the endothermic peaks of the untreated vinylidene fluoride copolymer observed at 185° C. or lower in the heat flow is specified, and a temperature lower than the endset is defined as a temperature for heating the emulsion.

The endset is specified as follows. A baseline is drawn linearly in such a manner that it overlaps with a linear heat flow on a high temperature side of the endothermic peak (e.g., higher than 185° C.). As shown in FIG. 1, a tangent line is drawn to the heat flow in a temperature range on a higher temperature side than the highest-temperature peak top and a temperature range on a lower temperature side than a lowest temperature at which the heat flow and the base line overlap, in the endothermic peaks of the vinylidene fluoride copolymer observed at 185° C. or lower in the heat flow. An intersection point of the tangent line and the base line is defined as the endset of the vinylidene fluoride copolymer.

From the perspective of appropriately changing the crystal structure of the untreated vinylidene fluoride copolymer in the emulsion, the temperature at which the emulsion is heated is preferably 40° C. or higher, more preferably 60° C. or higher, and still more preferably 80° C. or higher.

When the emulsion is heated at a temperature lower than the endset of the highest-temperature peak among the endothermic peaks of the vinylidene fluoride copolymer observed at 185° C. or lower, the crystal structure of the vinylidene fluoride copolymer in the emulsion is appropriately changed, and the vinylidene fluoride copolymer composition satisfying the physical properties is easily obtained. On the other hand, when the emulsion is heated at a temperature higher than the endset, the crystal structure of the vinylidene fluoride copolymer in the emulsion is significantly changed, the dispersion stability of the emulsion is lowered, and it is difficult to take out the vinylidene fluoride copolymer composition in a powder form.

When the polymerization is performed in the emulsion preparation, the heating can be carried out continuously after the polymerization. In this case, it is preferable that at least the unreacted vinylidene fluoride and the fluorinated alkyl vinyl compound are purged and removed from the system after the polymerization and before the heating, and then that heating is performed at the above-described temperature.

When the polymerization is performed in the emulsion preparation, the polymerization and the heating may be carried out separately. In this case, it is preferable to perform heating after cooling to a temperature lower than the polymerization temperature before the heating. Specifically, the cooling is preferably performed to a temperature at least 5° C. lower than the polymerization temperature. The cooling method at this time is not particularly limited. By cooling to this temperature, a heating effect (a change in state of the crystalline region of the untreated vinylidene fluoride copolymer) is easily obtained, and a vinylidene fluoride copolymer composition having the desired physical properties is easily obtained.

Meanwhile, when the polymerization is not performed in the emulsion preparation described above, for example, when a commercially available emulsion is used, the emulsion may be heated to the above temperature as it is.

In the present specification, heating the emulsion at a heating temperature means holding the emulsion at the heating temperature for a certain period of time. Since the heating is not intended to remove the initiator remaining in the emulsion, the heating time is not particularly limited as long as it is within a range in which the state of the crystalline region of the untreated vinylidene fluoride copolymer is changed. For example, the heating time is preferably 10 seconds or more and 24 hours or less, more preferably 20 seconds or more and 12 hours or less, and still more preferably 30 seconds or more and 6 hours or less. By holding the emulsion at the above heating temperature for the above period of time, the state of the crystalline region formed in the polymerization process of the untreated vinylidene fluoride copolymer is easily changed, and a vinylidene fluoride copolymer composition having the desired physical properties is easily obtained.

The heating method is not particularly limited, and the heating may be performed without stirring or while stirring the emulsion, but is preferably performed while stirring the emulsion from the perspective of dispersion stability of the emulsion. A heating device is also not particularly limited. The emulsion may be heated under pressure, saturated vapor pressure, or atmospheric pressure using an autoclave or the like.

Drying

In the drying, the aqueous medium is removed from the emulsion. Although the method for removing the aqueous medium is not particularly limited, it is preferable to perform drying at a temperature that does not affect the physical properties and the like of the vinylidene fluoride copolymer composition in the emulsion. The drying may be performed under atmospheric pressure or under reduced pressure. The drying produces the vinylidene fluoride copolymer composition in a solid state (powder form) described above. The drying method can be the same as the drying in the first method.

Third Method

The third method for producing the vinylidene fluoride copolymer composition includes, at least: adding a surfactant to the emulsion (hereinafter, the emulsion to which the surfactant is added is also referred to as "surfactant-containing emulsion") after the emulsion preparation and before the heating in the second method (hereinafter also referred to as "surfactant addition"). That is, the emulsion preparation, the surfactant addition, and the heating are performed in this order. After the heating, drying the surfactant-containing emulsion and extracting the vinylidene fluoride copolymer (hereinafter also referred to as "drying") produces the vinylidene fluoride copolymer composition in a solid state described above. Also in this method, after the vinylidene fluoride copolymer composition in a solid state is obtained, heating at a temperature equal to or higher than the melting point of the vinylidene fluoride copolymer composition is not performed. Each step will be described below.

Emulsion Preparation

In the emulsion preparation, an emulsion in which an untreated vinylidene fluoride copolymer is dispersed in an aqueous medium is prepared. The emulsion preparation can be the same as the emulsion preparation of the first method described above.

Surfactant Addition

In the surfactant addition, a surfactant-containing emulsion is prepared by adding a surfactant to the emulsion prepared in the above-described emulsion preparation step. When the polymerization is performed in the emulsion preparation, the emulsion (or surfactant-containing emulsion) may be cooled before, after, or during the addition of the surfactant.

When the polymerization is performed in the emulsion preparation, the emulsion or the surfactant-containing emulsion after the addition of the surfactant is preferably cooled to a temperature lower than the polymerization temperature in the emulsion preparation. Specifically, the cooling is preferably performed to a temperature at least 5° C. lower than the polymerization temperature. The cooling method at this time is not particularly limited. By cooling, an effect obtained by performing the heating (a change in state of the crystalline region of the untreated vinylidene fluoride copolymer) is easily obtained, and a vinylidene fluoride copolymer composition having the desired physical properties is easily obtained.

It is preferable to add a surfactant to the emulsion in this step because the stability of the emulsion is improved in the heating. Since it is sufficient that the emulsion in the heating is stable by the surfactant addition, the surfactant addition can be the same as the surfactant addition of the above-described first method except that the surface tension of the emulsion (surfactant-containing emulsion) after the addition and the amount thereof to be added are not limited.

In the surfactant addition, a surfactant is added to the emulsion prepared in the emulsion preparation, and they are stirred. At this time, the surface tension of the emulsion (surfactant-containing emulsion) after the addition is not particularly limited, but the surface tension at 25° C. is preferably 40 mN/m or less, and more preferably 35 mN/m or less.

The surfactant to be added in this step is not particularly limited as long as it is soluble or miscible in the aqueous medium contained in the above-described emulsion, and, for example, a non-ionic surfactant can also be used in addition to the surfactant added in the above-described first method. The non-ionic surfactant that can be used is the same as the surfactant contained in the vinylidene fluoride copolymer composition described above.

In this step, one type of the surfactant may be added, or two or more types thereof may be added. An excess component of the surfactant added in this step may be removed by dialysis, an ion exchange resin, or the like, if needed.

Heating

In the heating, the surfactant-containing emulsion obtained in the surfactant addition described above is heated. The heating can be the same as the heating of the second method described above.

In addition, after the heat treatment, the excess surfactant contained in the surfactant-containing emulsion may be removed by dialysis, an ion exchange resin, or the like. For example, dialysis can be performed by filling the heat-treated surfactant-containing emulsion in a dialysis membrane made of cellulose, immersing the latex together with the dialysis membrane in a water vessel filled with pure water, and exchanging the pure water in the water vessel at regular time intervals.

Drying

In the drying, the aqueous medium is removed from the surfactant-containing emulsion. The drying method can be the same as the drying in the first method.

2. Polymer Dispersion

The vinylidene fluoride copolymer composition described above can be used as an electrode mixture for forming an electrode layer or an electrolyte mixture for forming an electrolyte layer which will be described later in the form of a polymer dispersion in which the vinylidene fluoride copolymer composition described above and a dispersion medium are mixed.

In particular, as described above, the vinylidene fluoride copolymer composition has very good dispersibility in a dispersion medium having a low relative dielectric constant, and can maintain a stable state over a long period of time. The dispersion medium that can be used is preferably a medium that can be removed by drying and has a relative dielectric constant of 15 or less.

Here, the dispersion medium having a relative dielectric constant of 15 or less is not particularly limited, and examples thereof include a non-polar solvent and a low-polar solvent. Specific examples of the dispersion medium include hydrocarbon compounds, ether compounds having an ether bond, ketone compounds having a ketone group, and ester compounds having an ester bond. From the perspective of easy dehydration treatment, ester compounds are preferable.

The hydrocarbon compound may be a compound composed of carbon atoms and hydrogen atoms, and may have a chain structure, a branched structure, or a cyclic structure. The number of carbon atoms is not particularly limited, and the compound may have a multiple bond such as a double bond or a triple bond, or an aromatic structure. Specific examples of the hydrocarbon compound include pentane, hexane, heptane, octane, nonane, decane, dodecane, hexene, heptene, cyclohexane, cycloheptane, toluene, xylene, mesitylene, and tetralin.

Specific examples of the ether compound include alkylene glycol alkyl ethers (ethylene glycol monomethyl ether, ethylene glycol monobutyl ether, propylene glycol monomethyl ether, diethylene glycol monomethyl ether, diethylene glycol, dipropylene glycol, triethylene glycol, polyethylene glycol, propylene glycol monomethyl ether, dipropylene glycol monomethyl ether, tripropylene glycol monomethyl ether, diethylene glycol monobutyl ether, diethylene glycol monobutyl ether, and the like), dialkyl ethers (dimethyl ether, diethyl ether, diisopropyl ether, dibutyl ether, and the like), and cyclic ethers (tetrahydrofuran, dioxane (including each of 1,2-, 1,3-, and 1,4-isomers), morpholine, and the like).

Specific examples of the ketone compound include methyl ethyl ketone, methyl isobutyl ketone, diisobutyl ketone, diisopropyl ketone, cyclohexanone, phorone, acetophenone, and isophorone.

Specific examples of the ester compound include ethyl acetate, butyl acetate, propyl acetate, isopropyl acetate, isopentyl acetate, benzyl acetate, ethyl butyrate, propyl butyrate, butyl butyrate, isopentyl butyrate, ethyl propionate, butyl pentanoate, methyl lactate, ethyl lactate, butyl lactate, and ethylene glycol monoalkyl ether acetate.

From the perspective of easy dehydration treatment, butyl butyrate is preferable.

An amount of the dispersion medium in the polymer dispersion is appropriately selected depending on the use of the polymer dispersion, the type of the vinylidene fluoride copolymer composition, and the like, and is preferably 50 mass % or more and 99.9 mass % or less, and more preferably 75 mass % or more and 99.9 mass % or less, per 100 mass % of the polymer dispersion. When the amount of the dispersion medium falls within the above range, good dispersibility of the vinylidene fluoride copolymer composition in the polymer dispersion can be readily obtained.

The polymer dispersion may contain a solvent in addition to the dispersion medium and the vinylidene fluoride copolymer composition. The solvent is preferably a medium that can be removed by drying, and includes a polar solvent and an ionic liquid in addition to the nonpolar solvent and the low-polar solvent.

Examples of the solvent include amide compounds such as dimethylformamide, N, N-dimethylacetamide, and N-methylpyrrolidone; alcohols such as methanol, ethanol, isopropyl alcohol, 2-ethyl-1 hexanol, 1-nonanol, lauryl alcohol and tripropylene glycol; amine compounds such as o-toluidine, m-toluidine and p-toluidine; 1-ethyl-3 methylimidazolium bis(trifluoromethylsulfonyl) imide; lactones such as γ-butyrolactone and δ-butyrolactone; sulfoxide-sulfone compounds such as dimethyl sulfoxide and sulfolane; and ionic liquids such as ethylmethylimidazolium salt and butylmethylimidazolium salt.

An amount of the solvent in the polymer dispersion is not particularly limited as long as the dispersibility of the vinylidene fluoride copolymer composition in the polymer dispersion is maintained. In one example, the amount is preferably 10 mass % or less.

3. Electrode for Non-Aqueous Electrolyte Secondary Battery

The above-described polymer dispersion can be used in the formation of electrode layers of electrodes of various non-aqueous electrolyte secondary batteries and the like. An electrode for a non-aqueous electrolyte secondary battery includes, for example, a current collector and an electrode layer disposed on the current collector. In this case, the above-described polymer dispersion can be used in the formation of the electrode layer. The electrode may be for a positive electrode or for a negative electrode.

(1) Current Collector

The current collectors for the negative and positive electrodes are terminals for collecting electricity. A material for each of the current collectors is not particularly limited, and metal foil, metal mesh, or the like of aluminum, copper, iron, stainless steel, steel, nickel, titanium, or the like can be used. In addition, the current collector may be one produced by applying the metal foil, metal mesh, or the like on a surface of a medium.

(2) Electrode Layer

The electrode layer can be a layer obtained by mixing the above-described vinylidene fluoride copolymer composition or polymer dispersion, an active material, and a dispersion medium if needed, thereby preparing an electrode mixture, applying the electrode mixture onto the current collector, and drying the electrode mixture. The electrode layer may be produced only on one surface of the current collector or may be disposed on both surfaces. The dispersion medium in the electrode mixture is the same as that described above for the polymer dispersion.

The components of the electrode layer are appropriately selected depending on the type of the non-aqueous electrolyte secondary battery. For example, the electrode layer may be a layer containing the above-described vinylidene fluoride copolymer composition and an active material. An electrode layer of an electrode for an all-solid-state battery is preferably a layer containing the above-described vinylidene fluoride copolymer composition, an active material, and a solid electrolyte. The electrode layer may contain components other than these components, if needed. Examples of other components include various additives such as a conductive auxiliary, a pigment dispersant, an adhesion aid, and a thickener.

A content of the vinylidene fluoride copolymer composition relative to the total amount of the electrode layer is preferably 0.1 mass % or more and 50 mass % or less, more preferably 0.2 mass % or more and 40 mass % or less, and still more preferably 0.3 mass % or more and 30 mass % or less. When the amount of the vinylidene fluoride copolymer composition falls within the above range, good adhesiveness between the current collector and the active material, solid electrolyte, and other components in the electrode layer can be readily obtained.

The active material contained in the electrode layer is not particularly limited, and for example, a known active material for the negative electrode (negative electrode active material) or active material for the positive electrode (positive electrode active material) can be used.

Examples of the negative electrode active material include a carbon material, such as artificial graphite, natural graphite, non-graphitizable carbon, graphitizable carbon, activated carbon, and a material obtained by carbonizing a phenolic resin, a pitch, or the like by heat treatment; metal and metal alloy materials, such as Cu, Li, Mg, B, Al, Ga, In, Si, Ge, Sn, Pb, Sb, Bi, Cd, Ag, Zn, Hf, Zr, and Y; and metal oxides, such as GeO, $GeO_2$, SnO, $SnO_2$, PbO, and $PbO_2$. In addition, those in which a coating is applied to surfaces of the active materials are also included. Note that the negative electrode active material may be a commercially available product.

On the other hand, examples of the positive electrode active material include a lithium-based positive electrode active material containing lithium. Examples of the lithium-based positive electrode active material include: complex metal chalcogenide compounds represented by the general formula $LiMY_2$ (where M is at least one type of transition metal or two or more types of transition metals such as Co, Ni, Fe, Mn, Cr, or V, and Y is a chalcogen element such as O or S) such as $LiCoO_2$ or $LiNi_xCo_{1-x}O_2$ ($0<x\leq1$); complex metal oxides having a spinel structure such as $LiMn_2O_4$; and olivine-type lithium compounds such as $LiFePO_4$. In addition, those in which a coating is applied to surfaces of the active materials are also included. Note that the positive electrode active material may be a commercially available product.

An amount of the active material contained in the electrode layer is appropriately selected depending on the type thereof, the function of the electrode, the type of the battery, and the like, and is not particularly limited. In one example, the amount is preferably 50 mass % or more and 99.9 mass % or less relative to the total amount of the active material, the vinylidene fluoride copolymer composition, and the conductive auxiliary. When the content of the active material is in the range described above, a sufficient charge/discharge capacity can be obtained and good battery performance can be readily obtained, for example.

In addition, the conductive additive is not particularly limited as long as it is a compound that can increase electrical conductivity between the electrode active material or between the active material and the current collector. In the case where the electrode layer contains a solid electrolyte as another component, it is not particularly limited as long as it is a compound which can further increase the conductivity between the active material and the solid electrolyte, between the solid electrolyte and the current collector, or between the solid electrolytes in addition to the above. Examples of the conductive additive include acetylene black, Ketjen Black, carbon black, graphite powder, carbon nanofibers, carbon nanotubes, and carbon fibers.

An amount of the conductive auxiliary contained in the electrode layer is appropriately selected depending on the type thereof, the function of the electrode, the type of the battery, and the like, and is not particularly limited. The amount can be arbitrarily set depending on the type thereof and the type of the battery. From the viewpoints of improving the conductivity and increasing the dispersibility of the conductive auxiliary, in one example, the amount of the conductive auxiliary is preferably 0.1 mass % and 15 mass % or less, more preferably 0.1 mass % or more and 7 mass % or less, and still more preferably 0.1 mass % or more and 5 mass % or less relative to the total amount of the active material, the vinylidene fluoride copolymer composition, and the conductive auxiliary.

The solid electrolyte contained in the electrode mixture layer is not particularly limited as long as it is a solid compound having ion conductivity, and known inorganic solid electrolytes and polymer solid electrolytes can be used. Examples of the inorganic solid electrolyte include an oxide-based solid electrolyte, a sulfide-based solid electrolyte, a nitride-based solid electrolyte, and a complex hydride solid electrolyte. Examples of the polymer solid electrolyte include a gel-based electrolyte and an intrinsic polymer electrolyte.

Examples of the oxide-based solid electrolyte include, but are not limited to, perovskite-type LLTO, garnet-type LLZ, a NASICON-type compound, a LISICON-type compound, a LIPON-type compound, and a β-alumina-type compound. Specific examples include: $Li_3PO_4$, $Li_{0.34}La_{0.51}TiO_3$, $Li_{1.3}Al_{0.3}Ti_{1.7}(PO_4)_3$, $Li_7La_3Zr_2O_{12}$, $Li_6BaLa_2Ta_2O_{12}$, $Li_{2.9}PO_{3.3}N_{0.46}$, $Li_{4.3}Al_{0.3}Si_{0.7}O_4$, $50Li_4SiO_4$-$50Li_3BO_3$, $Li_2O$—$Al_2O_3$—$SiO_2$—$P_2O_5$—$TiO_2$, and $Li_{1.5}Al_{0.5}Ge_{1.5}(PO_4)_3$-$0.05Li_2O$.

The sulfide-based solid electrolyte includes a solid electrolyte containing Li, A (A is at least one of P, Si, Ge, Al, or B), and S, and may further contain a halogen element. In addition, examples of the sulfide-based solid electrolyte include LGPS (Li—Ge—P—S)-based compounds, argyrodite-type compounds, amorphous-based compounds, and Li—P—S-based compounds. Specific examples of the sulfide-based solid electrolyte include $Li_2S$—$P_2S_5$, $Li_2S$—$P_2S_3$, $Li_2S$—$P_2S_3$—$P_2S_5$, $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, LiI—$Li_2S$—$SiS_2$—$P_2S_5$, $Li_2S$—$SiS_2$—$Li_4SiO_4$, $Li_2S$—$SiS_2$—$Li_3PO_4$, $Li_3PS_4$—$Li_4GeS_4$, $Li_{3.4}P_{0.6}Si_{0.4}S_4$, $Li_{3.25}P_{0.25}Ge_{0.76}S_4$, $Li_{3.25}P_{0.75}Ge_{0.25}S_4$, $Li_{10}GeP_2S_{12}$, $Li_{4-x}Ge_{1-x}P_xS_4$, $Li_6PS_5Cl$, $Li_3PS_5Br$, and $Li_6PS_5I$.

Specific examples of the nitride-based solid electrolyte include, but are not limited to, $LiN_3$.

Specific examples of the complex hydride solid electrolyte include, but are not limited to, $LiBH_4$.

Specific examples of the gel-based electrolyte include, but are not limited to, poly(ethylene oxide)$_8$-$LiClO_4$(ethylene carbonate (EC)+propylene carbonate (PC)), poly(ethylene oxide)$_8$-$LiClO_4$(PC), poly(vinylidene fluoride)-LiN$(CF_3SO_2)_2$(EC+PC), poly(vinylidene fluoride-co-hexafluoropropylene)-$LiPF_6$(EC+diethyl carbonate (DEC)+dimethyl carbonate (DMC)), poly(ethylene glycol acrylate)-$LiClO_4$(PC), and poly(acrylonitrile)-$LiClO_4$(EC+PC), and poly(methyl methacrylate)-$LiClO_4$(PC).

Specific examples of the intrinsic polymer electrolytes include, but are not limited to, poly(ethylene oxide)$_8$-$LiClO_4$, poly(oxymethylene)-$LiClO_4$, poly(propylene oxide)$_8$-$LiClO_4$, poly(dimethyl siloxane)-$LiClO_4$, poly(vinylidene fluoride-co-hexafluoropropylene)-LiTFSI, poly(2,2-dimethoxypropylene carbonate)-LiFSI, and poly[(2-methoxy)ethylglycidyl ether]$_8$-$LiClO_4$.

The electrode layer may contain only one type or two or more types of the solid electrolytes.

An amount of the solid electrolyte when contained in the electrode layer is appropriately selected depending on the type thereof, the function of the electrode, the type of the battery, and the like, and is not particularly limited. In one example, the amount is preferably 1 mass % or more and 99.9 mass % or less relative to the total amount of the active material, the vinylidene fluoride copolymer composition, and the solid electrolyte. When the amount of the solid electrolyte falls within this range, sufficient ion conductivity can be obtained, and good battery performance can be readily obtained.

As described above, the electrode layer may contain a pigment dispersant, an adhesion aid, a thickener, and the like, and known compounds can be used as these components. The amounts of these components are not particularly limited as long as the objects and effects of the present invention are not impaired. In one example, the amounts are preferably 15 mass % or less relative to the total amount of the active material, the vinylidene fluoride copolymer composition, and these components.

The electrode layer may further contain additives such as phosphorus compounds, sulfur compounds, organic acids, amine compounds, and nitrogen compounds such as ammonium compounds; organic esters, various silane-based, titanium-based, and aluminum-based coupling agents; vinylidene fluoride polymers other than the above-described vinylidene fluoride copolymers, and resins such as polytetrafluoroethylene (PTFE), styrene-butadiene rubber (SBR), and polyacrylonitrile (PAN). These additives are not particularly limited as long as the objects and effects of the present invention are not impaired. In one example, the amounts of these additives are preferably 15 mass % or less relative to the total amount of the active material, the vinylidene fluoride copolymer composition, and these additives.

Here, a thickness of the electrode layer is not particularly limited, but is preferably 1 μm or greater and 1000 μm or less in one example. A basis weight of the active material contained in the electrode layer is not particularly limited, and may be any basis weight. In one example, the basis weight is preferably from 50 to 1000 $g/m^2$, and more preferably from 100 to 500 $g/m^2$.

Method for Forming Electrode Layer

The electrode layer can be formed by preparing an electrode mixture obtained by mixing the above-described vinylidene fluoride copolymer composition or polymer dispersion, an active material, and, if needed, a solid electrolyte, a dispersion medium, a solvent, a conductive auxiliary, various additives, and the like; applying the electrode mixture onto a current collector; and drying the electrode mixture.

The electrode mixture may be prepared by mixing all the components at once, or may be prepared by mixing some of the components first and then mixing the remaining components. At this time, the components are mixed preferably with a mixer equipped with a temperature controller to prevent an excessive increase of the temperature of the mixture for the electrode layer.

The dispersion medium and the solvent in the electrode mixture may be any dispersion medium and solvent as long as they can uniformly disperse the vinylidene fluoride copolymer composition, the active material, the solid electrolyte, the conductive auxiliary, and the like. The type of the dispersion medium to be added is not particularly limited, but is preferably the same as the dispersion medium contained in the polymer dispersion described above. When a solvent is added, it is preferably the same as the solvent contained in the polymer dispersion described above. The total amount of the dispersion medium in the polymer dispersion and the dispersion medium added thereto is not particularly limited and may be any amount in terms of production. In one example, the total amount is preferably 10 parts by mass or more and 20000 parts by mass or less per 100 parts by mass of the above-described active material. The total amount of the solvent in the polymer dispersion and the solvent added thereto is not particularly limited and may be any amount in terms of production. In one example, the total amount is preferably 2000 parts by mass or less per 100 parts by mass of the above-described active material.

A viscosity of the electrode mixture is not particularly limited as long as it can prevent dripping, uneven application of the electrode, and delay in drying after application when the electrode mixture is applied, thereby obtaining an electrode, and the workability of electrode preparation and the coatability of the electrode are good. In one example, the viscosity of 0.1 Pa·s or greater and 100 Pa·s or less is preferable. The viscosity of the electrode mixture is measured by an E-type viscometer or the like.

The method of applying the electrode mixture is not particularly limited, and a doctor blade method, a reverse roll method, a comma bar method, a gravure method, an air knife method, a die coating method, a dip coating method, and the like can be employed.

After the application of the electrode mixture, the electrode mixture is heated at any temperature to dry the solvent (dispersion medium). In one example, a drying temperature is preferably 30° C. or higher and 500° C. or lower. The drying may be performed multiple times at various temperatures. At this time, the drying may be performed under atmospheric pressure, increased pressure, or reduced pressure. After the drying, a heat treatment may be further performed.

After the application and drying of the electrode mixture, press treatment may be further performed. Performing the press treatment can improve the electrode density. In one example, a pressing pressure is preferably 1 kPa or greater and 10 GPa or less.

4. Electrolyte Layer for Non-Aqueous Electrolyte Secondary Battery

The above-described vinylidene fluoride copolymer composition or polymer dispersion can also be used in the production of, for example, an electrolyte layer for a non-aqueous electrolyte secondary battery. The electrolyte layer for a non-aqueous electrolyte secondary battery (hereinafter also simply referred to as "electrolyte layer") may include only an electrolyte layer, for example. The above-described polymer dispersion (vinylidene fluoride copolymer) can be used as a material for the electrolyte layer.

The electrolyte layer may contain at least the above-described vinylidene fluoride copolymer composition and an electrolyte, and may further contain other components, if needed. The electrolyte layer may be a layer for binding an electrode and an electrolyte, a layer for conducting various ions, or a layer simultaneously performing these functions. In the electrolyte layer, the vinylidene fluoride copolymer composition described above may be a particle, film (including porous film), or gel.

The all-solid-state battery has, for example, a structure in which an electrolyte layer is interposed between a pair of electrodes (each of which has a current collector and an electrode layer). The polymer dispersion can also be used in the formation of an electrolyte layer for such an all-solid-state battery.

The electrolyte layer may be, for example, a layer obtained by preparing an electrolyte mixture containing a vinylidene fluoride copolymer composition or a polymer dispersion, a solid electrolyte, a dispersion medium if needed, and optionally other components, applying the prepared electrolyte mixture onto a substrate, and drying the applied electrolyte mixture. At this time, the layer may be a layer obtained by peeling the dried layer from the substrate. Alternatively, it may be a layer obtained by directly applying the electrolyte mixture onto the electrode and drying the applied electrolyte mixture.

As the solid electrolyte contained in the electrolyte layer, the same compounds as those described in the description of the electrode layer of the electrode described above can be used. An amount of the solid electrolyte relative to the total amount of the electrolyte layer is appropriately selected according to the type thereof, the function of the electrolyte layer, the type of the battery, and the like, and is not particularly limited. In one example, the amount is preferably 10 mass % or more and 99.9 mass % or less relative to the total amount of the electrolyte layer.

Furthermore, the electrolyte layer may contain components other than the above-described vinylidene fluoride copolymer and the above-described solid electrolyte, and examples thereof include a pigment dispersant, an adhesion aid, a thickener, a filler, and various additives. Known compounds can be used as the pigment dispersant, the adhesion aid, and the thickener, and the additives may be the same as the additives contained in the electrode layer. Amounts of the additives are not particularly limited as long as the objects and effects of the present invention are not impaired. In one example, the amounts are preferably 0.1 mass % or more and 90 mass % or less relative to the total amount of the electrolyte layer.

The filler contained in the electrolyte layer may be an inorganic filler or an organic filler. Examples of the inorganic filler include oxides such as silicon dioxide ($SiO_2$), alumina ($Al_2O_3$), titanium dioxide ($TiO_2$), calcium oxide (CaO), strontium oxide (SrO), barium oxide (BaO), magnesium oxide (MgO), zinc oxide (ZnO), and barium titanate ($BaTiO_3$); hydroxides such as magnesium hydroxide ($Mg(OH)_2$), calcium hydroxide ($Ca(OH)_2$), zinc hydroxide ($Zn(OH)_2$), aluminum hydroxide ($Al(OH)_3$), and aluminum hydroxide oxide (AlO(OH)); carbonates such as calcium carbonate ($CaCO_3$); sulfates such as barium sulfate; nitrides; clay minerals; and boehmite. The electrolyte layer may contain only one type of filler or may contain two or more types of fillers. Amounts of the additives are not particularly limited as long as the objects and effects of the present invention are not impaired. In one example, the amounts are preferably 0.1 mass % or more and 90 mass % or less relative to the total amount of the electrolyte layer.

A thickness of the electrolyte layer is appropriately selected according to the function of the electrolyte layer, and is not particularly limited, but is preferably 1 μm or greater and 1000 μm or less in one example.

The amount of the vinylidene fluoride copolymer composition relative to the total amount of the electrolyte layer is appropriately selected according to the type thereof, the function of the electrolyte layer, the type of the battery, and the like, and is not particularly limited, but is preferably 0.1 mass % or more and 10 mass % or less in one example.

The method for forming the electrolyte layer is not particularly limited, and, as described above, the electrolyte layer can be formed by applying and drying the electrolyte mixture. The methods for applying and drying the electrolyte mixture are the same as those employed in the method for forming the electrode layer. In addition, as the electrolyte mixture, the above-described polymer dispersion may be mixed with the solid electrolyte as it is, or a dispersion medium or a solvent may be further added, if needed. The dispersion medium used in the formation of the electrolyte layer is not particularly limited, but is preferably the same as the dispersion medium contained in the polymer dispersion described above.

5. Non-Aqueous Electrolyte Secondary Battery

The above-described vinylidene fluoride copolymer composition or polymer dispersion can be used in electrodes and electrolyte layers for various non-aqueous electrolyte secondary batteries including all-solid-state batteries as described above, but may also be used in the formation of other layers of the non-aqueous electrolyte secondary batteries.

EXAMPLES

The present invention will be described in further detail below with reference to examples. The scope of the present invention is not to be construed as being limited by these examples.

<Preparation of Emulsion>

(1) Preparation of Emulsion 1

To an autoclave was added 280 parts by mass of ion-exchanged water and degassed by nitrogen bubbling for 30 min. Next, 0.2 parts by mass of disodium hydrogen phosphate and 1.0 parts by mass of ammonium salt of perfluorooctanoic acid (PFOA) as a surfactant were added. For three times, the autoclave was pressured to 4.5 MPa and purged with nitrogen gas. Then, 0.1 parts by mass of ethyl acetate, 11 parts by mass of vinylidene fluoride (VDF), and 24 parts by mass of hexafluoropropylene (HFP) were added to the autoclave. The temperature was increased to 80° C. while the mixture was stirred. Then, 5 mass % of ammonium persulfate (APS) aqueous solution was added so that the APS amount became 0.06 parts by mass, and then polymerization was started. 65 parts by mass of VDF were continuously added immediately after polymerization was started so that the pressure in the autoclave was maintained at 2.5 MPa. After the completion of the addition, the polymerization was completed when the pressure dropped to 1.5 MPa, and, after cooling to 40° C. or lower, the residual monomer was removed by purging from the autoclave, thereby obtaining Emulsion 1 in which an untreated vinylidene fluoride copolymer was dispersed in water. The solid content concentration of Emulsion 1 (concentration of the vinylidene fluoride copolymer) was 21.0 mass %. In addition, the untreated vinylidene fluoride copolymer was taken out by freeze-drying, and an endset of an endothermic peak observed at 185° C. or lower of the vinylidene fluoride copolymer was measured on the basis of the method which will be described later and found to be 132° C.

Method for Specifying Endset

First, the emulsion was freeze-dried, thereby obtaining a powdery vinylidene fluoride copolymer. Then, a mold having a length of 5 cm× a width of 5 cm× a thickness of 150 μm and about 1 g of the powdery vinylidene fluoride copolymer were sandwiched between two aluminum foils sprayed with a release agent, and pressed at 200° C., thereby preparing a film. Then, a heat flow of the vinylidene fluoride copolymer was obtained by measurement in accordance with ASTM D 3418 using a differential scanning calorimeter ("DSC-1" available from METTLER). In the obtained heat flow, a baseline was linearly drawn in such a manner that it overlapped with a linear heat flow in a temperature range on a higher temperature side than the highest-temperature peak top in the endothermic peaks of the vinylidene fluoride copolymer observed at 185° C. or lower. Then, a tangent line was drawn to the heat flow in a temperature range on a higher temperature side than the highest-temperature peak top and a temperature range on a lower side than the lowest temperature at which the heat flow and the base line overlapped, in the endothermic peaks of the vinylidene fluoride copolymer observed at 185° C. or lower, and an intersection point of the tangent line and the base line was defined as the endset of the vinylidene fluoride copolymer.

(2) Preparation of Emulsion 2

Polymerization was performed in the same manner as in the preparation of Emulsion 1 except that the amount of VDF collectively added into the autoclave was changed from 11 parts by mass to 15 parts by mass and the amount of HFP was changed from 24 parts by mass to 20 parts by mass before the start of polymerization, thereby obtaining Emulsion 2 in which an untreated vinylidene fluoride copolymer was dispersed in water. The solid content concentration of Emulsion 2 (concentration of the vinylidene fluoride copolymer) was 20.8 mass %. The endset of the highest-temperature peak among the endothermic peaks of the untreated vinylidene fluoride copolymer of the vinylidene fluoride copolymer observed at 185° C. or lower and specified by the same method as for Emulsion 1 was 134° C.

(3) Preparation of Emulsion 3

Polymerization was performed in the same manner as in the preparation of Emulsion 1 except that the amount of VDF collectively added into the autoclave was changed from 11 parts by mass to 25 parts by mass and the amount of HFP was changed from 24 parts by mass to 10 parts by mass before the start of polymerization, thereby obtaining Emulsion 3 in which an untreated vinylidene fluoride copolymer was dispersed in water. The solid content concentration of Emulsion 3 (concentration of the vinylidene fluoride copolymer) was 21.3 mass %. The endset of the highest-temperature peak among the endothermic peaks of the untreated vinylidene fluoride copolymer specified by the same method as for Emulsion 1 was 152° C.

Example 1

Emulsion 1 was added to an autoclave, and sodium dodecyl sulfate (SDS) was further added thereto in such a manner that the concentration of the SDS with respect to the water in the emulsion was 1 mass %, thereby obtaining a surfactant-containing emulsion. At this time, the surface tension at 25° C. of the surfactant-containing emulsion was measured. The results are shown in Table 1.

Then, the emulsion was heated at 125° C., which is a temperature lower than the endset, for 1 hour while being stirred at 500 rpm. Thereafter, while stirring was continued, air cooling was performed at room temperature (24° C.) until the temperature in the autoclave decreased to 40° C. or lower. The emulsion was freeze-dried, thereby obtaining a powdery vinylidene fluoride copolymer composition. The powdery vinylidene fluoride copolymer composition had an average secondary particle diameter of 174 μm. At this time, the freeze-dried product was obtained by freezing the emulsion after polymerization with liquid nitrogen and drying under reduced pressure at room temperature.

Example 2

A powdery vinylidene fluoride copolymer composition was obtained by performing heat treatment and freeze-drying in the same manner as in Example 1 except that the concentration of the SDS with respect to the water in Emulsion 1 was changed from 1 mass % to 0.5 mass %. The powdery vinylidene fluoride copolymer composition had an average secondary particle diameter of 141 μm.

Example 3

A powdery vinylidene fluoride copolymer composition was obtained by performing heat treatment and freeze-drying in the same manner as in Example 2 except that the surfactant added to Emulsion 1 was changed from SDS to EMULGEN LS-110 (polyoxyalkylene alkyl ether, available from Kao Corporation). The powdery vinylidene fluoride copolymer composition had an average secondary particle diameter of 197 μm.

Example 4

A powdery vinylidene fluoride copolymer composition was obtained by performing heat treatment and freeze-drying in the same manner as in Example 2 except that the surfactant added to Emulsion 1 was changed from SDS to PFOA (perfluorooctanoic acid). The powdery vinylidene fluoride copolymer composition had an average secondary particle diameter of 163 μm.

Example 5

A powdery vinylidene fluoride copolymer composition was obtained by performing heat treatment and freeze-drying in the same manner as in Example 2 except that the heating temperature for Emulsion 1 was changed from 125° C. to 95° C. The powdery vinylidene fluoride copolymer composition had an average secondary particle diameter of 391 μm.

Example 6

A powdery vinylidene fluoride copolymer composition was obtained by performing heat treatment and freeze-drying in the same manner as in Example 2 except that the heating temperature for Emulsion 1 was changed from 125° C. to 75° C. The powdery vinylidene fluoride copolymer composition had an average secondary particle diameter of 364 μm.

Example 7

A powdery vinylidene fluoride copolymer composition was obtained by performing heat treatment and freeze-drying in the same manner as in Example 2 except that the concentration of the SDS with respect to the water in Emulsion 1 was changed from 0.5 mass % to 0 mass %. The powdery vinylidene fluoride copolymer composition had an average secondary particle diameter of 173 μm.

Example 8

A powdery vinylidene fluoride copolymer composition was obtained by performing heat treatment and freeze-drying in the same manner as in Example 6 except that the concentration of the SDS with respect to the water in Emulsion 1 was changed from 0.5 mass % to 0 mass %. The powdery vinylidene fluoride copolymer composition had an average secondary particle diameter of 424 μm.

Example 9

A powdery vinylidene fluoride copolymer composition was obtained by performing heat treatment and freeze-drying in the same manner as in Example 2 except that the emulsion added to the autoclave was changed from Emulsion 1 to Emulsion 2, and that the heating temperature for the emulsion (surfactant-containing emulsion) after addition of the surfactant was changed from 125° C. to 130° C. The powdery vinylidene fluoride copolymer composition had an average secondary particle diameter of 52 μm.

Example 10

Emulsion 1 was added to an autoclave, and PFOA was further added thereto in such a manner that the concentration of the PFOA relative to water in the emulsion was 0.5 mass %. Then, PFOA was dissolved in the emulsion by stirring at room temperature (24° C.) and 500 rpm. The emulsion was freeze-dried, thereby obtaining a powdery vinylidene fluoride copolymer composition. The powdery vinylidene fluoride copolymer composition had an average secondary particle diameter of 160 μm.

Example 11

Emulsion 1 was added to an autoclave, and SDS was further added thereto in such a manner that the concentration of the SDS relative to water in the emulsion was 1% by mass. The mixture was stirred at room temperature (24° C.) and 500 rpm, thereby dissolving the SDS in the emulsion. The emulsion was freeze-dried, thereby obtaining a powdery vinylidene fluoride copolymer composition. The powdery vinylidene fluoride copolymer composition had an average secondary particle diameter of 148 μm.

Example 12

A powdery vinylidene fluoride copolymer composition was obtained by performing dissolution and freeze-drying in the same manner as in Example 11 except that the concentration of the SDS with respect to the water in the emulsion was changed from 1 mass % to 0.5 mass %. The powdery vinylidene fluoride copolymer composition had an average secondary particle diameter of 126 μm.

Example 13

A powdery vinylidene fluoride copolymer composition was obtained by performing dissolution and freeze-drying in the same manner as in Example 10 except that the concentration of the PFOA with respect to the water in the emulsion was changed from 0.5 mass % to 1 mass %. The powdery vinylidene fluoride copolymer composition had an average secondary particle diameter of 219 μm.

Example 14

A powdery vinylidene fluoride copolymer composition was obtained by performing dissolution and freeze-drying in the same manner as in Example 10 except that the concentration of the PFOA with respect to the water in the emulsion was changed from 0.5 mass % to 0.1 mass %. The powdery vinylidene fluoride copolymer composition had an average secondary particle diameter of 178 μm.

Example 15

Emulsion 1 was added to an autoclave, and Acetamine 86 (stearylamine acetate, available from Kao Corporation) was further added thereto in such a manner that the concentration of Acetamine 86 relative to water in the emulsion was 0.05 mass %. The mixture was stirred at room temperature (24° C.) and 500 rpm, thereby dissolving Acetamine 86 in the emulsion. The emulsion was freeze-dried, thereby obtaining a powdery vinylidene fluoride copolymer composition. The powdery vinylidene fluoride copolymer composition had an average secondary particle diameter of 821 μm.

Comparative Example 1

Emulsion 1 was freeze-dried, thereby obtaining a powdery vinylidene fluoride copolymer composition. The powdery vinylidene fluoride copolymer composition had an average secondary particle diameter of 215 μm.

Comparative Example 2

A powdery vinylidene fluoride copolymer composition was obtained by heat-treating the powdery vinylidene fluoride copolymer composition obtained in Example 11 at 125° C. for 1 hour. Since the vinylidene fluoride copolymer composition was intensely aggregated, the average secondary particle diameter was unmeasurable.

Comparative Example 3

A powdery vinylidene fluoride copolymer composition was obtained by heat-treating the powdery vinylidene fluoride copolymer composition obtained in Comparative Example 1 at 125° C. for 1 hour. Since the vinylidene fluoride copolymer composition was intensely aggregated, the average secondary particle diameter was unmeasurable.

Comparative Example 4

A powdery vinylidene fluoride copolymer composition was obtained by performing dissolution and freeze-drying in the same manner as in Example 10 except that the surfactant to be added to the emulsion was changed from PFOA to EMULGEN LS-110. The powdery vinylidene fluoride copolymer composition had an average secondary particle diameter of 127 μm.

Comparative Example 5

A powdery vinylidene fluoride copolymer composition was obtained by performing heat treatment and freeze-drying in the same manner as in Example 2 except that the emulsion added to the autoclave was changed from Emulsion 1 to Emulsion 3 and that the heating temperature for the emulsion was changed from 125° C. to 150° C. The powdery vinylidene fluoride copolymer composition had an average secondary particle diameter of 39 μm.

Comparative Example 6

A powdery vinylidene fluoride copolymer composition was obtained by adding sodium dodecyl sulfate (SDS) to the powdery vinylidene fluoride copolymer composition obtained in Comparative Example 1 in an amount of 1 mass % relative to the water in the emulsion before freeze-drying. The powdery vinylidene fluoride copolymer composition had an average secondary particle diameter of 215 μm.

Comparative Example 7

Heat treatment was performed in the same manner as in Example 2 except that the heating temperature for Emulsion 1 was changed from 125° C. to 180° C. Since an emulsion having dispersion stability could not be recovered by the heating, a powdery vinylidene fluoride copolymer composition could not be obtained.

Comparative Example 8

Heat treatment was performed in the same manner as in Example 7 except that the heating temperature for Emulsion 1 was changed from 125° C. to 180° C. Since an emulsion having dispersion stability could not be recovered by the heating, a powdery vinylidene fluoride copolymer composition could not be obtained.

<Methods for Measuring Various Physical Properties>

The physical properties of the vinylidene fluoride copolymer composition, the emulsion, and the like were measured as follows.

Measurement of Solid Content Concentration of Each Emulsion

About 5 g of the obtained emulsion was placed in an aluminum cup and dried at 80° C. for 3 hours. The concentration (solid content concentration) of the vinylidene fluoride copolymer in the emulsion was then calculated by measuring the weights before and after drying.

Measurement of Average Secondary Particle Diameter of Vinylidene Fluoride Copolymer Composition The average secondary particle diameter of the vinylidene fluoride copolymer composition was measured on a volume basis by a laser diffraction/scattering method for the powdery vinylidene fluoride copolymer composition, and the cumulative average diameter (D50) of the particle size distribution was calculated. Specifically, approximately 0.5 mg of the powdery vinylidene fluoride copolymer composition was dispersed in water by stirring, using a Microtrac MT3300EXII, available from MicrotracBEL Corp, and used as a sample for measurement. A measurement medium was set as water, a medium refractive index was set to 1.333, a particle shape was set as non-spherical particles, a refractive index of the particles was set to 1.42, a measurement time was set to 30 seconds, and an average value of D50 when measured five times in a transmission mode was set as an average secondary particle diameter.

Measurement of Melting Point of Vinylidene Fluoride Copolymer Composition

The melting point of the vinylidene fluoride copolymer composition was measured in the form of a film produced by the following method. First, a mold having a length of 5 cm× a width of 5 cm× a thickness of 150 μm and about 1 g of the powdery vinylidene fluoride copolymer composition were sandwiched between two aluminum foils sprayed with a release agent, and pressed at 200° C., thereby preparing a press film. The melting point was then measured by using a differential scanning calorimeter ("DSC-1" available from METTLER) in accordance with ASTM D 3418.

Temperature-Modulated Differential Scanning Calorimetry

The peak top of the reversing heat flow (RHF) and the enthalpy of fusion of the vinylidene fluoride copolymer composition were measured using a temperature-modulated differential scanning calorimetry (Q-100, available from TA Instruments). Specifically, about 5 mg of the vinylidene fluoride copolymer composition made into a powder by freeze drying was packed in an aluminum pan, thereby preparing a measurement sample. The measurement conditions were an average heating rate of 5° C./min, a modulation period of 40 seconds, and a modulation amplitude of ±0.531° C. so that the heat-only condition was obtained. The obtained reversing heat flow had a downwardly convex endothermic peak. In the obtained reversing heat flow, a base line was linearly drawn in such a manner that it overlapped with a linear heat flow on a higher temperature side than the endset. Among the downwardly convex endothermic peaks of the reversing heat flow, when a line is drawn vertically from the base line toward the reversing heat flow, a point on the reversing heat flow at which the distance from the base line is the longest was set as the peak top of the endothermic peak, and the temperature of the peak top was specified. The number of minimum values of the downwardly convex endothermic peaks of the reversing heat flow was defined as the number of peak tops of the endothermic peaks. Meanwhile, an area surrounded by the base line and the reversing heat flow was defined as the amount of enthalpy of fusion ($\Delta Hm$).

Measurement of Surface Tension of Emulsion

The surface tension of the emulsion (in the case where a surfactant was added to the emulsion, the emulsion after the addition of the surfactant to the emulsion) was measured with a surface tensiometer (Sigma 701/700, available from KSV instruments) using the Wilhelmy method. For the measurement, a platinum plate was used, and an average value when the surface tension at 25° C. was measured 3 times was defined as a value of the surface tension.

Measurement of Content Rate of Vinylidene Fluoride Copolymer Composition in Supernatant of Butyl Butyrate Dispersion of Vinylidene Fluoride Copolymer Composition First, 2 g of the powdery vinylidene fluoride copolymer composition was added to 18 g of butyl butyrate, and they were stirred for 30 minutes on a stirrer at 25° C., thereby preparing a butyl butyrate dispersion of the vinylidene fluoride copolymer composition (content rate of the vinylidene fluoride copolymer composition: 10 mass %). The dispersion (20 mL) was placed in a 20 mL graduated cylinder, and the graduated cylinder was covered with parafilm, and left to stand for 20 hours. The supernatant (4 mL) in the graduated cylinder was collected with a pipette, placed in an aluminum cup, dried at 135° C. for 1 hour, and allowed to cool in a desiccator for 1 hour. Then, by measuring the weights before and after drying, the content rate of the vinylidene fluoride copolymer composition in the supernatant of the butyl butyrate dispersion of the vinylidene fluoride copolymer composition was specified.

Haze

The haze of the dispersion obtained by dispersing the vinylidene fluoride copolymer composition in butyl butyrate was measured by the following method. First, 2 g of the powdery vinylidene fluoride copolymer composition was added to 18 g of butyl butyrate, and they were stirred for 30 minutes on a stirrer at 25° C., thereby preparing a butyl butyrate dispersion of the vinylidene fluoride copolymer composition (content rate of the vinylidene fluoride copolymer composition: 10 mass %). Then, the haze of the dispersion obtained by leaving the sample to stand for 20 hours and then stirring it again was measured with NDH2000 (in accordance with JIS K 7136) available from Nippon Denshoku Industries Co., Ltd.) Note that the sample was put in a quartz cell. The haze of butyl butyrate was set to 0%, and the haze of the sample was calculated.

TABLE 1

| | Type of emulsion | Surfactant addition: Type of surfactant | | Surfactant addition: Item to be added | Surfactant addition: Amount of surfactant relative to water in emulsion (mass %) | Surfactant addition: Surface tension after addition of surfactant (@ 25° C.) (mN/m) | Heating: Heating temperature (° C.) | Heating: End set (° C.) | Heating: Item to be heated |
|---|---|---|---|---|---|---|---|---|---|
| Example 1 | 1 | Non-perfluoro anion | SDS | Emulsion | 1 | 29.1 | 125 | 132 | Emulsion |
| Example 2 | 1 | Non-perfluoro anion | SDS | Emulsion | 0.5 | 29.1 | 125 | 132 | Emulsion |
| Example 3 | 1 | Non-perfluoro non-ion | LS-110 | Emulsion | 0.5 | 25.4 | 125 | 132 | Emulsion |
| Example 4 | 1 | Fluorine anion | PFOA | Emulsion | 0.5 | 26.9 | 125 | 132 | Emulsion |
| Example 5 | 1 | Non-perfluoro anion | SDS | Emulsion | 0.5 | 29.1 | 95 | 132 | Emulsion |
| Example 6 | 1 | Non-perfluoro anion | SDS | Emulsion | 0.5 | 29.1 | 75 | 132 | Emulsion |
| Example 7 | 1 | No | — | No | — | 42.2 | 125 | 132 | Emulsion |
| Example 8 | 1 | No | — | No | — | 42.2 | 75 | 132 | Emulsion |
| Example 9 | 2 | Non-perfluoro anion | SDS | Emulsion | 0.5 | 26.7 | 130 | 134 | Emulsion |
| Example 10 | 1 | Fluorine anion | PFOA | Emulsion | 0.5 | 26.9 | — | — | — |
| Example 11 | 1 | Non-perfluoro anion | SDS | Emulsion | 1 | 29.1 | — | — | — |
| Example 12 | 1 | Non-perfluoro anion | SDS | Emulsion | 0.5 | 29.1 | — | — | — |
| Example 13 | 1 | Fluorine anion | PFOA | Emulsion | 1 | 18.6 | — | — | — |
| Example 14 | 1 | Fluorine anion | PFOA | Emulsion | 0.1 | 38.0 | — | — | — |
| Example 15 | 1 | Non-perfluoro cation | Acetamine 86 | Emulsion | 0.05 | 36.3 | — | — | — |
| Comparative Example 1 | 1 | No | — | No | — | 42.2 | — | — | — |
| Comparative Example 2 | 1 | Non-perfluoro anion | SDS | Emulsion | 1 | 29.1 | 125 | — | Powder |
| Comparative Example 3 | 1 | No | — | No | — | 42.2 | 125 | — | Powder |
| Comparative Example 4 | 1 | Non-perfluoro non-ion | LS-110 | Emulsion | 0.5 | 25.4 | — | — | — |
| Comparative Example 5 | 3 | Non-perfluoro anion | SDS | Emulsion | 0.5 | 30.4 | 150 | 152 | Emulsion |
| Comparative Example 6 | 1 | Non-perfluoro anion | SDS | Powder | 0.5 | 42.2 | — | — | — |
| Comparative Example 7 | 1 | Non-perfluoro anion | SDS | Emulsion | 0.5 | 29.1 | 180 | 132 | Emulsion |
| Comparative Example 8 | 1 | No | — | No | — | 42.2 | 180 | 132 | Emulsion |

TABLE 2

| | Melting point of vinylidene fluoride copolymer composition (° C.) | Maximum endothermic peak temperature in reversing heat flow (° C.) | Amount of enthalpy of fusion ΔHm (J/g) | Number of peak tops in endothermic peak |
|---|---|---|---|---|
| Example 1 | 115 | 116 | 13.8 | 2 |
| Example 2 | 115 | 110 | 20.5 | 2 |
| Example 3 | 115 | 107 | 18.4 | 2 |
| Example 4 | 115 | 112 | 13.7 | 2 |
| Example 5 | 115 | 119 | 14.1 | 2 |
| Example 6 | 115 | 119 | 20.5 | 2 |
| Example 7 | 115 | 107 | 18.5 | 2 |
| Example 8 | 115 | 118 | 24.2 | 2 |
| Example 9 | 120 | 112 | 31.0 | 2 |
| Example 10 | 115 | 118 | 21.2 | 1 |
| Example 11 | 115 | 118 | 21.3 | 1 |
| Example 12 | 115 | 117 | 25.0 | 1 |
| Example 13 | 115 | 119 | 17.8 | 1 |
| Example 14 | 115 | 119 | 18.5 | 1 |
| Example 15 | 115 | 118 | 25.9 | 1 |
| Comparative Example 1 | 115 | 118 | 28.3 | 1 |

TABLE 2-continued

| | | | | |
|---|---|---|---|---|
| Comparative Example 2 | 115 | 130 | 11.0 | 2 |
| Comparative Example 3 | 115 | 130 | 5.6 | 2 |
| Comparative Example 4 | 115 | 117 | 27.1 | 1 |
| Comparative Example 5 | 141 | 138 | 69.2 | 1 |
| Comparative Example 6 | 115 | 117 | 24.8 | 1 |
| Comparative Example 7 | Unmeasurable*3 | Unmeasurable*3 | Unmeasurable*3 | Unmeasurable*3 |
| Comparative Example 8 | Unmeasurable*3 | Unmeasurable*3 | Unmeasurable*3 | Unmeasurable*3 |

| | Absolute value of difference between maximum endothermic peak temperature and melting point (° C.) | Content rate of vinylidene fluoride copolymer composition in upper 20 vol % of butyl butyrate dispersion (mass %) | Haze of butyl butyrate dispersion (%) | Average secondary particle diameter of vinylidene fluoride copolymer composition D50 (μm) |
|---|---|---|---|---|
| Example 1 | 1 | 9.1 | 72 | 174 |
| Example 2 | 5 | 9.7 | 94 | 141 |
| Example 3 | 8 | 9.5 | 50 | 197 |
| Example 4 | 3 | 9.2 | 59 | 163 |
| Example 5 | 4 | 9.7 | 98 | 391 |
| Example 6 | 4 | 8.0 | 98 | 364 |
| Example 7 | 8 | 8.9 | 73 | 173 |
| Example 8 | 3 | 7.2 | 84 | 424 |
| Example 9 | 8 | 7.0 | 94 | 52 |
| Example 10 | 3 | 5.7 | 65 | 160 |
| Example 11 | 3 | 6.5 | 99 | 148 |
| Example 12 | 2 | 6.4 | 99 | 126 |
| Example 13 | 4 | 5.5 | 61 | 219 |
| Example 14 | 4 | 6.1 | 64 | 178 |
| Example 15 | 3 | 5.5 | 69 | 821 |
| Comparative Example 1 | 3 | 3.2 | 66 | 215 |
| Comparative Example 2 | 15 | 3.6 | Unmeasurable*1 | Unmeasurable*2 |
| Comparative Example 3 | 15 | 2.9 | Unmeasurable*1 | Unmeasurable*2 |
| Comparative Example 4 | 2 | 3.0 | 80 | 127 |
| Comparative Example 5 | 3 | 0.0 | 95 | 39 |
| Comparative Example 6 | 2 | 0.0 | Unmeasurable*1 | 215 |
| Comparative Example 7 | Unmeasurable*3 | Unmeasurable*3 | Unmeasurable*3 | Unmeasurable*3 |
| Comparative Example 8 | Unmeasurable*3 | Unmeasurable*3 | Unmeasurable*3 | Unmeasurable*3 |

*1 Unmeasurable since the vinylidene fluoride copolymer composition was precipitated in butyl butyrate.

*2 Unmeasurable due to intense aggregation of the vinylidene fluoride copolymer particles.

*3 Unmeasurable since the vinylidene fluoride copolymer composition cannot be recovered in the form of a stable emulsion after the heating, and cannot be obtained in the form of particles (powder) by the subsequent drying.

As shown in Table 2 above, the dispersibility of the vinylidene fluoride copolymer composition was good (Examples 1 to 15), when the vinylidene fluoride copolymer composition had a melting point of 140° C. or lower; the vinylidene fluoride copolymer composition had an endothermic peak having an amount of enthalpy of fusion (ΔHm) of 2 mJ/g in the reversing heat flow; an absolute value of a difference between the melting point of the composition and the maximum endothermic peak temperature (peak top temperature of the largest endothermic peak) was 10° C. or lower; and, after a dispersion in which the vinylidene fluoride copolymer composition was dispersed in butyl butyrate (content rate of the vinylidene fluoride copolymer composition: 10 mass %) was left to stand for 20 hours, the content rate of the vinylidene fluoride copolymer composition in the upper portion of the dispersion was 4.0 mass % or more and 10 mass % or less.

On the other hand, when the melting point of the vinylidene fluoride copolymer composition exceeded 140° C., the composition was very easily precipitated in butyl butyrate (Comparative Example 5). Furthermore, when the absolute value of the difference between the melting point of the vinylidene fluoride copolymer composition and the maximum endothermic peak temperature (peak top temperature of the largest endothermic peak) with an amount of enthalpy of fusion (ΔHm) of 2 mJ/g in the reversing heat flow of the composition exceeded 10° C., the composition was intensely aggregated (Comparative Examples 2 and 3). Furthermore, when the content of the vinylidene fluoride copolymer composition in the upper portion of the dispersion in which the vinylidene fluoride copolymer composition was dispersed in butyl butyrate (content of the vinylidene fluoride copolymer composition: 10 mass %) after the dispersion was left to stand for 20 hours was beyond the range of 4.0 mass % or more and 10 mass %, dispersibility was low in all the cases (Comparative Examples 1 to 8).

In addition, as shown in Table 1, a vinylidene fluoride copolymer composition having the desired physical properties was obtained by adding a certain amount of the surfactant to the emulsion of the vinylidene fluoride copolymer (copolymer dispersion) or by heating the emulsion (Examples 1 to 15). On the other hand, when no surfactant was added to the emulsion of the vinylidene fluoride copolymer and the emulsion was not heated, the vinylidene fluoride copolymer composition was easily precipitated in butyl butyrate (Comparative Example 1).

Furthermore, regardless of whether or not the surfactant was added to the emulsion, when the vinylidene fluoride copolymer composition was powdered and then heated, the vinylidene fluoride copolymer composition was easily precipitated in butyl butyrate (Comparative Examples 2 and 3).

Furthermore, also when a surfactant which was not ionic (non-ionic surfactant) was added to the emulsion and the emulsion was not heated, the vinylidene fluoride copolymer composition was easily precipitated in butyl butyrate (Comparative Example 4).

Furthermore, when the vinylidene fluoride copolymer composition was powdered and then the surfactant was added thereto, the vinylidene fluoride copolymer composition was easily precipitated in butyl butyrate (Comparative Example 6).

Furthermore, when the melting point of the vinylidene fluoride copolymer composition exceeded 140° C., a vinylidene fluoride copolymer composition having the desired physical properties could not be obtained even when the surfactant was added to the emulsion or the surfactant-containing emulsion was heated (Comparative Example 5).

When the emulsion of the vinylidene fluoride copolymer was heated at a temperature higher than the endset of the highest-temperature peak among the endothermic peaks of the vinylidene fluoride copolymer observed at 185° C. or lower when the heat flow of the vinylidene fluoride copolymer in the emulsion was measured with a differential scanning calorimeter, a vinylidene fluoride copolymer composition having the desired physical properties could not be obtained regardless of whether or not the surfactant was added to the emulsion (Comparative Examples 7 and 8).

The present application claims priority from the Japanese Patent Application No. 2020-198148 filed on Nov. 30, 2020. The contents described in the specification of this application are all incorporated in the specification of the present application.

INDUSTRIAL APPLICABILITY

The vinylidene fluoride copolymer composition of the present invention is easily dispersed in a dispersion medium having a low relative dielectric constant, and hardly precipitates even when the dispersion is stored for a long period of time. Thus, the vinylidene fluoride copolymer composition is very useful in preparation of an electrode layer or an electrolyte layer for a non-aqueous electrolyte secondary battery and the like.

The invention claimed is:

1. A method for producing a vinylidene fluoride copolymer composition, the vinylidene fluoride copolymer composition comprising a vinylidene fluoride copolymer containing a structural unit derived from vinylidene fluoride and a structural unit derived from a fluorinated alkyl vinyl compound, the method comprising:

preparing an emulsion containing an untreated vinylidene fluoride copolymer dispersed in an aqueous medium; and obtaining a surfactant-containing emulsion having a surface tension of 40 mN/m or less at 25° C. by adding an ionic surfactant and stirring into the emulsion, wherein the vinylidene fluoride copolymer composition has a melting point of 140° C. or lower.

2. A method for producing a vinylidene fluoride copolymer composition, the vinylidene fluoride copolymer composition comprising a vinylidene fluoride copolymer containing a structural unit derived from vinylidene fluoride and a structural unit derived from a fluorinated alkyl vinyl compound, the method comprising:

preparing an emulsion containing an untreated vinylidene fluoride copolymer dispersed in an aqueous medium by an emulsion polymerization method; and when measuring a heat flow of the untreated vinylidene fluoride copolymer with a differential scanning calorimeter, heating the emulsion at a temperature which is lower than an endset of a highest-temperature peak among endothermic peaks observed at 185° C. or lower and is 40° C. or higher;

wherein the method further comprises, after the preparing the emulsion and before the heating the emulsion, adding a surfactant to the emulsion; and wherein the vinylidene fluoride copolymer composition has a melting point of 140° C. or lower.

3. The method for producing a vinylidene fluoride copolymer composition according to claim 1, wherein the fluorinated alkyl vinyl compound is hexafluoropropylene.

4. The method for producing a vinylidene fluoride copolymer composition according to claim 2, wherein the fluorinated alkyl vinyl compound is hexafluoropropylene.

5. The method for producing a vinylidene fluoride copolymer composition according to claim 3, wherein the vinylidene fluoride copolymer composition comprises 15 mass % or more and 70 mass % or less of a structural unit derived from the hexafluoropropylene per 100 mass % of structural units of the vinylidene fluoride copolymer.

6. The method for producing a vinylidene fluoride copolymer composition according to claim 4, wherein the vinylidene fluoride copolymer composition comprises 15 mass % or more and 70 mass % or less of a structural unit derived from the hexafluoropropylene per 100 mass % of structural units of the vinylidene fluoride copolymer.

7. The method for producing a vinylidene fluoride copolymer composition according to claim 1, wherein the ionic surfactant comprises an anionic surfactant.

8. The method for producing a vinylidene fluoride copolymer composition according to claim 3, wherein the ionic surfactant comprises an anionic surfactant.

9. The method for producing a vinylidene fluoride copolymer composition according to claim 5, wherein the ionic surfactant comprises an anionic surfactant.

* * * * *